United States Patent
Okada

(10) Patent No.: US 9,456,154 B2
(45) Date of Patent: Sep. 27, 2016

(54) IMAGING APPARATUS AND DARK CHARGE MEASURING METHOD

(71) Applicant: Panasonic Intellectual Property Management Co., Ltd., Osaka (JP)

(72) Inventor: Yusuke Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 28 days.

(21) Appl. No.: 14/566,923

(22) Filed: Dec. 11, 2014

(65) Prior Publication Data

US 2015/0256776 A1 Sep. 10, 2015

(30) Foreign Application Priority Data

Mar. 7, 2014 (JP) ................................. 2014-045725

(51) Int. Cl.
*H04N 5/361* (2011.01)
*H04N 5/232* (2006.01)

(52) U.S. Cl.
CPC .......... *H04N 5/361* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 4,760,453 A | 7/1988 | Hieda | |
| 5,376,966 A | 12/1994 | Takase | |
| 5,493,334 A | 2/1996 | Zortea et al. | |
| 6,798,456 B1 | 9/2004 | Sato | |
| 8,259,197 B2 | 9/2012 | Sambongi | |
| 2003/0214590 A1* | 11/2003 | Matherson | H04N 5/361 348/243 |
| 2004/0150738 A1* | 8/2004 | Sakimoto | H04N 5/23293 348/333.11 |
| 2009/0167905 A1* | 7/2009 | Ishibashi | H04N 5/361 348/241 |
| 2010/0073516 A1* | 3/2010 | Minakuti | H04N 5/217 348/229.1 |
| 2010/0149376 A1* | 6/2010 | Kiba | H04N 5/772 348/231.2 |
| 2012/0188369 A1* | 7/2012 | Griesbach | H04N 5/361 348/143 |

FOREIGN PATENT DOCUMENTS

| | | |
|---|---|---|
| JP | 2001-24951 | 1/2001 |
| JP | 2001-78084 | 3/2001 |
| JP | 2001-358976 | 12/2001 |
| JP | 2009-77047 | 4/2009 |

* cited by examiner

*Primary Examiner* — Dennis Hogue
(74) *Attorney, Agent, or Firm* — Wenderoth, Lind & Ponack, L.L.P.

(57) ABSTRACT

An imaging apparatus including: a solid-state imaging device including pixels arranged in rows and columns, the device including: an OB pixel unit including rows of light-shielding pixels among the pixels; and a valid pixel unit including pixels allowing light from the subject to enter among the pixels; an exposure control unit which exposes the second pixel unit; a read line selecting unit which sequentially selects one or more pixel rows of the OB pixel unit, at different timings during exposure of the valid pixel unit, and causes each of pixels of the one or more pixel rows to output a pixel signal; and a dark charge measuring unit which measures the quantity of dark charge due to dark current of the device using current ones of pixel signals, each time pixel signals are output from the OB pixel unit through the selection by the read line selecting unit.

15 Claims, 20 Drawing Sheets

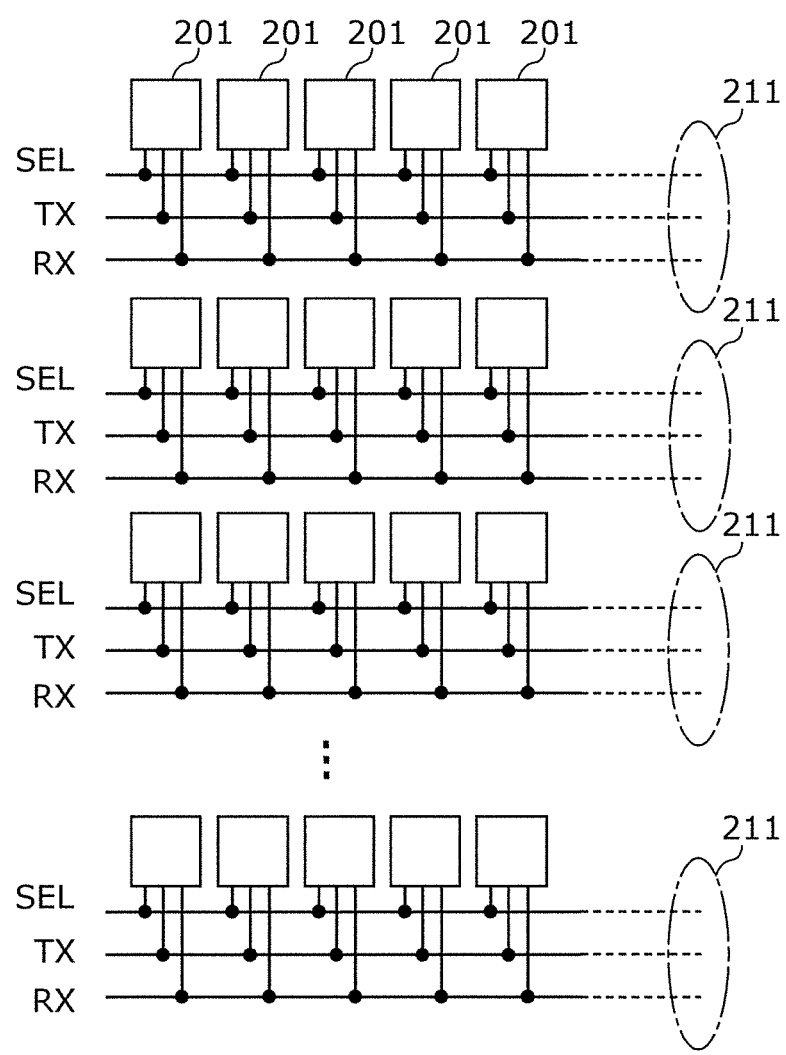

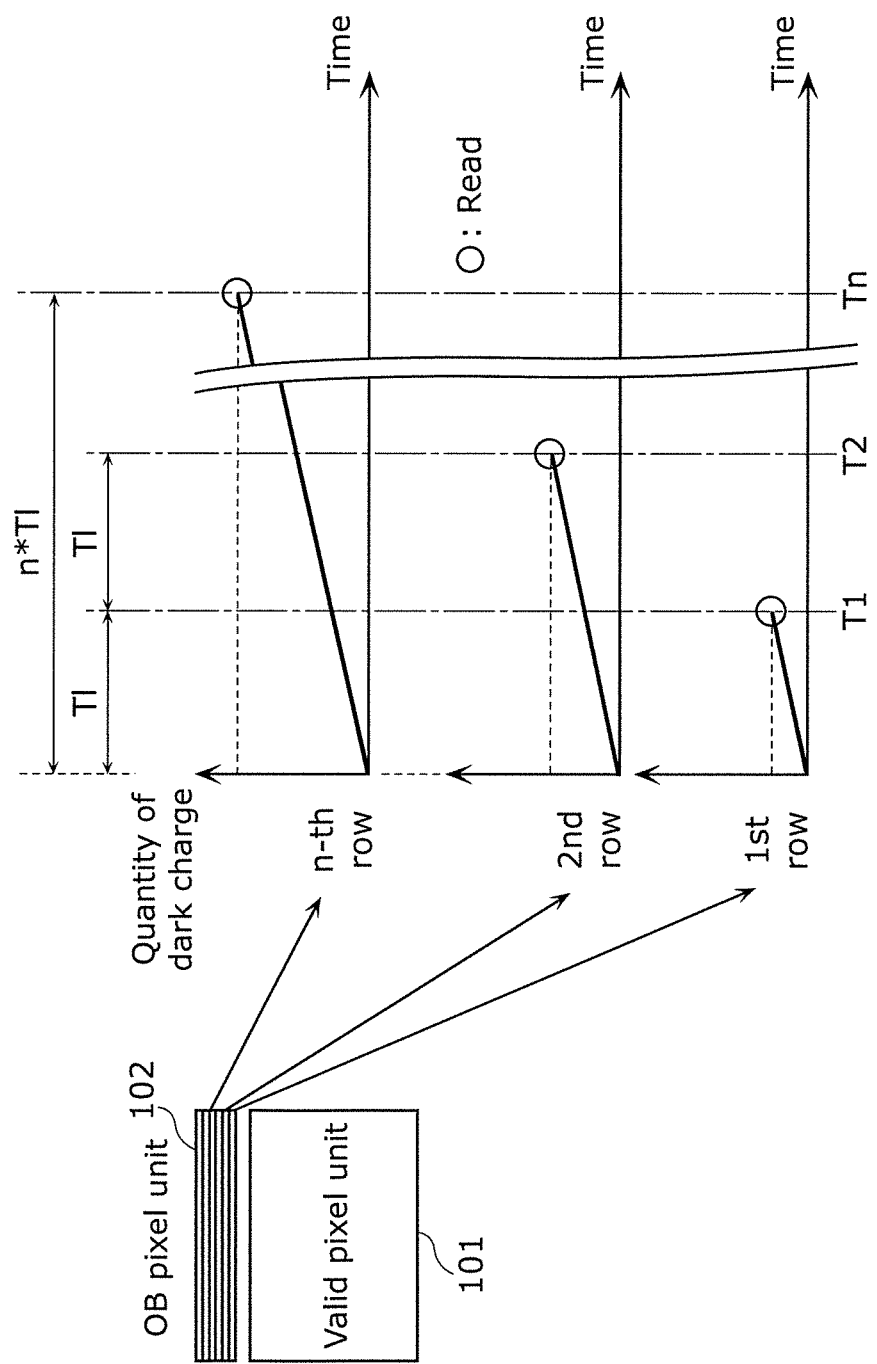

IMAGING APPARATUS AND DARK CHARGE MEASURING METHOD

CROSS REFERENCE TO RELATED APPLICATION

The present application is based on and claims priority of Japanese Patent Application No. 2014-045725 filed on Mar. 7, 2014. The entire disclosure of the above-identified application, including the specification, drawings and claims is incorporated herein by reference in its entirety.

FIELD

The present disclosure relates to an imaging apparatus which images a subject, and a dark charge measuring method using the imaging apparatus.

BACKGROUND

Patent Literature 1 discloses an imaging apparatus capable of performing long exposure shooting with a small deterioration in image quality, by ringing a buzzer for informing that a maximum exposure time approaches during the shooting. The imaging apparatus includes a sensor for measuring a temperature of a solid-state imaging device, and calculates a maximum exposure time within a range in which deterioration in image quality is small and allowable by a user, using a temperature measured by the sensor before the long exposure shooting. Subsequently, during the long exposure shooting, a user is informed of a timing for stopping the exposure by ringing a buzzer when a previously-calculated maximum exposure time approaches in the long exposure shooting. In this way, this imaging apparatus is capable of informing the user of the timing for stopping the exposure.

CITATION LIST

Patent Literature

[PTL 1]
Japanese Unexamined Patent Publication No. 2001-078084

SUMMARY

Technical Problem

The present disclosure provides an imaging apparatus and a dark charge measuring method for stopping exposure at an appropriate timing.

Solution to Problem

An imaging apparatus according to an aspect of the present disclosure is an imaging apparatus which images a subject, the imaging apparatus including: a solid-state imaging device in which a plurality of pixels are arranged in rows and columns, the solid-state imaging device including: a first pixel unit in which a plurality of rows of pixels shielded from light among the plurality of pixels are arranged; and a second pixel unit in which pixels allowing light from the subject to enter among the plurality of pixels are arranged; an exposure control unit configured to expose the second pixel unit; a row selecting unit configured to sequentially select one or more pixel rows of the first pixel unit, at a plurality of timings different from each other during exposure of the second pixel unit, and cause each of pixels of the one or more pixel rows selected to output a pixel signal; and a dark charge measuring unit configured to measure a quantity of dark charge due to dark current of the solid-state imaging device using current ones of pixel signals, each time pixel signals are output from the first pixel unit through the selection by the row selecting unit.

Advantageous Effects

The imaging apparatus according to the present disclosure is capable of stopping exposure at an appropriate timing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a partly enlarged view of FIG. 3, for illustrating a detailed configuration of the solid-state imaging device in Embodiment 1.

FIG. 7 is a diagram for explaining quantities of dark charge measured by a dark current component measuring unit in Embodiment 1.

Figure 1:
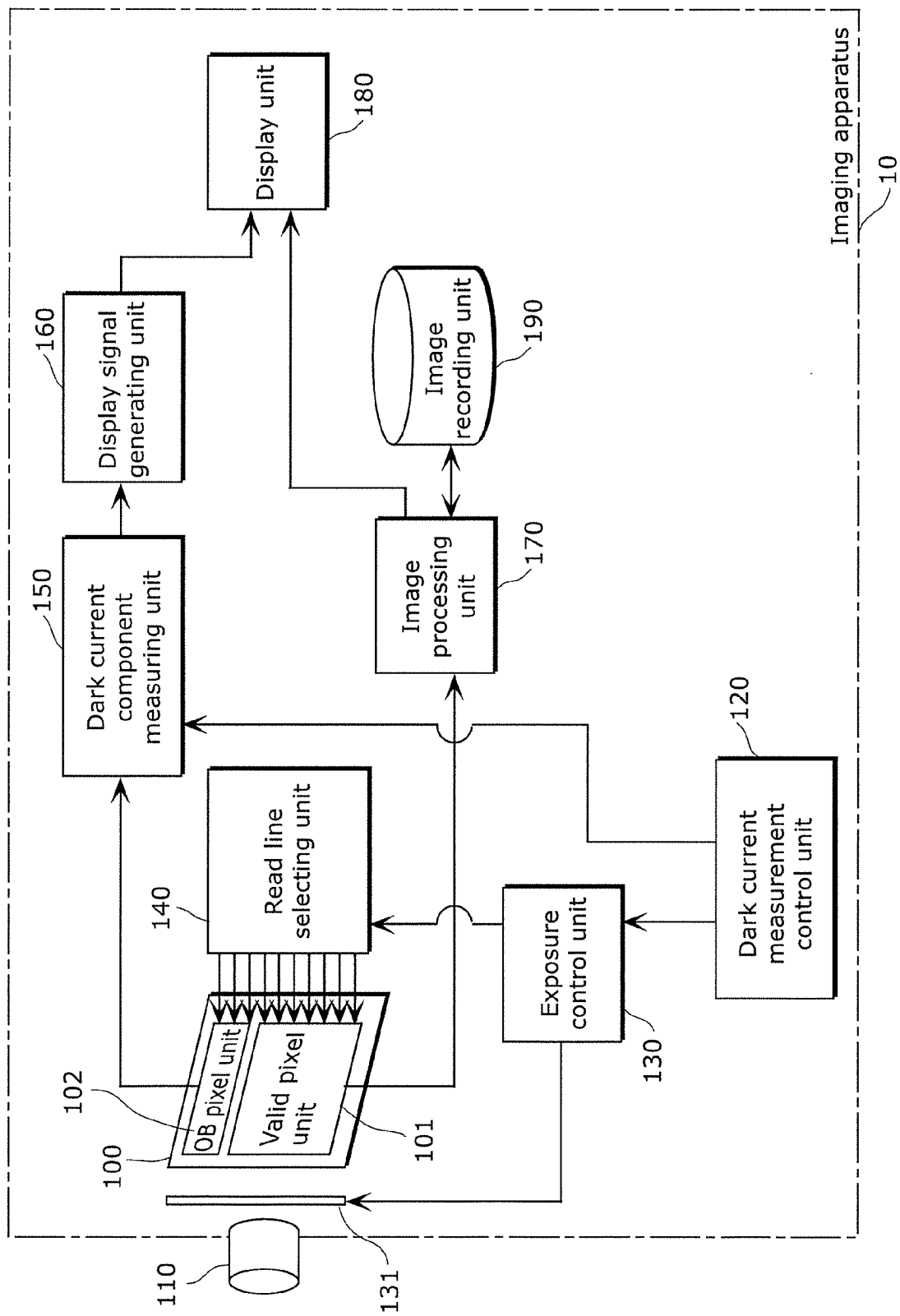
FIG. 1 is a block diagram illustrating a configuration of an imaging apparatus according to Embodiment 1.

DESCRIPTION OF EMBODIMENTS (Underlying Knowledge Forming Basis of the Present Disclosure)

First, underlying knowledge forming basis of the present disclosure is described before describing embodiments.

In long exposure shooting, an image having a higher contrast can be obtained when the exposure time is longer. In other words, an image of a darker subject can be captured when an exposure time is longer. On the other hand, in long exposure shooting, image quality is deteriorated more significantly due to dark current of a solid-state imaging device when an exposure time is longer.

Thus, when a dark subject such as a starry sky or the like is shot by long exposure shooting, a darker star (having a large stellar magnitude) can be shot when an exposure time is longer, but the quality of the resulting image is deteriorated due to noise such as white flow, white spot, shading, and/or the like caused by dark current.

For this reason, in long exposure shooting, a subject needs to be shot with an exposure time appropriate for the subject.

Here, in long exposure shooting, a solid-state imaging device may be exposed for a long exposure time (for example, one second to approximately several hours) by keeping a shutter open while a shutter button is being pressed by a user. In other words, shooting may be started without determining an exposure time before shooting. Thus, in order to perform shooting with an approximate exposure time in such a case, the exposure needs to be stopped at an appropriate timing.

However, it is difficult to stop exposure at an appropriate timing during shooting after accurately predicting noise that may occur due to dark current in the shooting. The reasons are explained below.

Conceivable methods for predicting noise include a method for measuring a temperature of a solid-state imaging device using a sensor before shooting. However, this method is difficult to accurately predict noise considering possible variation in temperature of the solid-state imaging device during the shooting. Thus, it is difficult to stop the exposure at an appropriate timing using the method.

In addition, noise that occurs due to dark current is stemming from charge (hereinafter may be referred to as dark charge) that occurs due to dark current of the solid-state imaging device. However, the method for measuring the temperature of the solid-state imaging device using the sensor as described above does not enable measurement of the quantity of real dark charge that is occurring. Therefore, it is difficult to accurately predict noise that occurs due to dark current. Thus, it is difficult to stop the exposure at an appropriate timing using the method.

As described above, it has been difficult to stop exposure at an appropriate timing considering noise that occurs during shooting with a long exposure time that is not determined in advance.

In view of this, the Inventors invented an imaging device capable of stopping exposure at an appropriate timing and a dark charge measuring method.

The imaging apparatus according to an aspect of the present disclosure is an imaging apparatus which images a subject, the imaging apparatus including: a solid-state imaging device in which a plurality of pixels are arranged in rows and columns, the solid-state imaging device including: a first pixel unit in which a plurality of rows of pixels shielded from light among the plurality of pixels are arranged; and a second pixel unit in which pixels allowing light from the subject to enter among the plurality of pixels are arranged; an exposure control unit configured to expose the second pixel unit; a row selecting unit configured to sequentially select one or more pixel rows of the first pixel unit, at a plurality of timings different from each other during exposure of the second pixel unit, and cause each of pixels of the one or more pixel rows selected to output a pixel signal; and a dark charge measuring unit configured to measure a quantity of dark charge due to dark current of the solid-state imaging device using current ones of pixel signals, each time pixel signals are output from the first pixel unit through the selection by the row selecting unit.

In this way, the imaging apparatus reads pixel signals at a plurality of timings different from each other during the exposure, and measures the quantity of dark charge. In this way, it is possible to measure variation in the quantity of dark charge due to environmental change during the exposure. Thus, it is possible to stop exposure at an appropriate timing. In other words, the user of the imaging apparatus is capable of easily determining an appropriate timing for stopping the exposure.

In addition, the imaging apparatus may further include a remaining time generating unit configured to generate remaining time information indicating a remaining exposure time using a difference between the quantity of dark charge measured by the dark charge measuring unit and a maximum quantity of dark charge, each time the quantity of dark charge is measured.

By using the remaining time information generated in this way, it is possible to perform imaging with an exposure time that increases contrast while keeping deterioration in image quality within an allowable range. In other words, it is possible to easily determine an appropriate timing for stopping the exposure.

In addition, the maximum quantity of dark charge may be specified by a user, the imaging apparatus may further include: an image processing unit configured to superimpose a noise component on an image before the exposure of the second pixel unit, the noise component corresponding to a standard quantity of dark charge to be used by the user as a standard for specifying the maximum quantity of dark charge; and a display unit configured to display the image with the noise component superimposed.

In this way, by displaying an image on which a noise component is superimposed, the user can check predicted deterioration in image quality before specification of the maximum quantity of dark charge. Thus, it is possible to specify the maximum quantity of dark charge, appropriate for the user.

In addition, the exposure control unit may be configured to stop exposure when the quantity of dark charge measured by the dark charge measuring unit is larger than the maximum quantity of dark charge.

Here, in the long exposure shooting, the exposure time may depend only on a user operation without being determined in advance or automatically. In this case, when the user cannot perform an operation of stopping the exposure for some reason, a larger quantity of dark charge than intended by the user may occur. Such dark charge may cause image quality deterioration unintended by the user. For this reason, by stopping the exposure when the measured quantity of dark charge is larger than the maximum quantity of charge, it is possible to reduce deterioration in image quality unintended by the user.

In addition, the imaging apparatus may further include an informing unit configured to inform a user of the remaining exposure time using the remaining time information, each time the remaining time information is generated by the remaining time generating unit.

Here, if such a remaining exposure time is not informed, it is difficult for the user to determine a timing for stopping the exposure considering environmental change during the exposure. In other words, in this case, the user may miss the appropriate timing for stopping the exposure. In view of this, by informing the user of the remaining exposure time, the user can recognize the remaining exposure time, and the possibility that the user misses the appropriate timing for stopping the exposure is reduced.

In addition, the informing unit may be configured to inform the user of the remaining exposure time by displaying a graphic symbol indicating a percentage of the difference in the maximum quantity of dark charge.

In this way, the graphic symbol indicating, as the percentage, the difference between the measured quantity of dark charge and the maximum quantity of dark charge, in the maximum quantity of dark charge is displayed, and based on the displayed graphic symbol, the user can intuitively recognize the remaining exposure time. Thus, the possibility that the user misses the appropriate timing for stopping the exposure is further reduced.

In addition, the imaging apparatus may further include: an image processing unit configured to superimpose, on an image, a noise component corresponding to the quantity of dark charge, each time the quantity of dark charge is measured by the dark charge measuring unit; and a display unit configured to display an image with the noise component superimposed.

In this way, by displaying the image on which the noise component corresponding to the quantity of dark charge measured by the dark charge measuring unit is superimposed, the user can check the predicted image quality deterioration during the exposure. Thus, it is possible to stop the exposure at the appropriate timing.

In addition, the row selecting unit may further be configured to select a pixel row of the second pixel unit, and may cause each of pixels of the pixel row selected to output a pixel signal, and the image processing unit may further be configured to generate an image using the pixel signals output from the second pixel unit through the selection by the row selecting unit, and superimpose the noise component on the image.

In other words, the image displayed on the display unit is the image obtainable by superimposing the noise component corresponding to the measured quantity of dark charge onto the image of the subject that is currently being shot. Thus, it is possible to check deterioration in quality of the image of the subject due to dark current. As a result, it is possible to stop the exposure at the timing more appropriate for the subject than in the case where the image obtainable by superimposing the noise component onto the sample image is displayed.

Furthermore, these general or specific aspects may be presented as a dark charge measuring method using an imaging apparatus which images a subject. The imaging apparatus may include: a solid-state imaging device in which a plurality of pixels are arranged in rows and columns, and the solid-state imaging device may include: a first pixel unit in which a plurality of rows of pixels shielded from light among the plurality of pixels are arranged; and a second pixel unit in which pixels allowing light from the subject to enter among the plurality of pixels are arranged. The dark charge measuring method may include: selecting at least one pixel row of the first pixel unit, and outputting a pixel signal from each of pixels in the at least one pixel row; and measuring a quantity of dark charge in dark current of the solid-state imaging device, using the pixel signal output in the selecting, wherein the selecting and the measuring are repeated during exposure of the second pixel unit, and the selection of the at least one pixel row is changed in the selecting per repetition.

Hereinafter, embodiments are described in detail, referring to the drawings as necessary. It is to be noted that excessively detailed descriptions may not be given below. For example, well-known maters may not be described in detail, and substantially the same configurations may not be described repeatedly. This prevents the following descriptions from being unnecessarily redundant, and helps any person skilled in the art to appreciate the present disclosure.

The inventor provides the attached drawings and the following descriptions so that any person skilled in the art to fully appreciate the present disclosure. Therefore, the drawings and the following descriptions should not be interpreted as limiting the scope of the Claims.

Embodiment 1

The imaging apparatus according to this embodiment is, for example, a digital camera which images a subject, and performs long exposure shooting on the subject. In addition, the imaging apparatus is also capable of performing bulb shooting in which a shutter remains open while a shutter button is being pressed by a user.

Hereinafter, Embodiment 1 is described with reference to FIGS. 1 to 11.

[1-1. Configuration]

[1-1-1. Configuration of Imaging Apparatus]

FIG. 1 is a block diagram illustrating a configuration of an imaging apparatus according to Embodiment 1. The imaging apparatus 10 is, for example, a digital camera which images a subject.

The imaging apparatus 10 illustrated in the diagram includes: a solid-state imaging device 100; a lens 110; a dark current measurement control unit 120; an exposure control unit 130; a mechanical shutter 131; a read line selecting unit 140 (row selecting unit); a dark current component measuring unit 150 (dark charge component measuring unit); a display signal generating unit 160 (remaining time generating unit); an image processing unit 170; a display unit 180; and an image recording unit 190.

The solid-state imaging device 100 includes a plurality of pixels arranged in rows and columns: an OB (Optical black) pixel unit 102 (a first pixel unit) in which a plurality of pixels shielded from light (for example, several tens of rows of pixels) among the plurality of pixels are arranged; and a valid pixel unit 101 (a second pixel unit) in which pixels that allow light from the subject to enter among the plurality of pixels are arranged. The solid-state imaging element 100 performs photoelectric conversion of the light incident through the lens 110, and outputs a pixel signal that is an electric signal indicating the luminance of the subject. The detailed configuration of the solid-state imaging device 100 will be described later.

The lens 110 forms an image of the subject on the solid-state imaging device 100.

The dark current measurement control unit 120 receives an instruction from the user, and controls the exposure control unit 130 and the dark current component measuring unit 150. More specifically, the dark current measurement control unit 120 receives a user operation of the shutter button (not illustrated), and outputs, to the exposure control unit 130, a shutter operation signal indicating whether the shutter button is pressed by the user. In addition, when an instruction "Display remaining exposure time" from the user, the dark current measurement control unit 120 causes the dark current component measuring unit 150 to operate.

The exposure control unit 130 exposes the solid-state imaging device 100. More specifically, the exposure control unit 130 causes the solid-state imaging device 100 to start or stop exposure by controlling the mechanical shutter 131 to open or close using the shutter operation signal input from the dark current measurement control unit 120. In other words, the exposure control unit 130 is capable of arbitrarily setting an exposure time of the solid-state imaging device 100 according to the user instruction in the long exposure shooting.

In addition, the exposure control unit 130 generates a pixel reading signal and a reset signal, and supplies (outputs) the read line selecting unit 140.

The mechanical shutter 131 is opened and closed by the exposure control unit 130. In other words, the mechanical shutter 131 exposes the solid-state imaging device 100 by being opened by the exposure control unit 130, and shields the solid-state imaging device 100 by being closed by the exposure control unit 130.

The read line selecting unit 140 selects at least one pixel row (hereinafter also referred to as a horizontal line) in the solid-state imaging device 100, and causes each of the pixels in the selected pixel row to output a pixel signal. More specifically, the read line selecting unit 140 selects one or more horizontal lines from either the valid pixel unit 101 or the OB pixel unit 102, and supplies, to the selected horizontal line, the read signals to be supplied from the exposure control unit 130 and reset signals. More specifically, the read line selecting unit 140 distributes the read signals and reset signals supplied from the exposure control unit 130, and thereby generates and supplies read signals and reset signals corresponding to each of the horizontal lines.

Here, in the long exposure shooting, the read line selecting unit 140 sequentially selects one or more pixel rows in the OB pixel unit 102, at timings different from each other during exposure of the valid pixel unit 101, and causes each of the pixels of the selected pixel row to output a pixel signal. Hereinafter, output of a pixel signal is also referred to as a read of a pixel signal.

The dark current component measuring unit 150 measures the quantity of dark charge generated by dark current of the solid-state imaging device 100 using pixel signals, each time pixel signals are output from the OB pixel unit 102 through the selection by the read line selecting unit 140. Here, dark charge is charge stored due to dark current of the solid-state imaging device 100.

In this way, the imaging apparatus 10 according to this embodiment reads pixel signals at timings different from each other during exposure, and measures the quantity of dark charge each time pixel signals are read. In this way, it is possible to control a timing for stopping exposure tracking variation in the quantity of dark charge that occurs. Thus, it is possible to stop exposure at an appropriate timing. In other words, the imaging apparatus 10 is capable of updating the storage state of dark charge in real time, and stopping the exposure at an appropriate timing.

The display signal generating unit 160 generates an informing signal (remaining time information) indicating a remaining exposure time, using the difference between the measured quantity of dark charge measured by the dark current component measuring unit 150 and the maximum quantity of dark charge, each time the quantity of dark charge is measured. In other words, the display signal generating unit 160 generates an informing signal for informing the user of a remaining exposure time based on a measured value of dark charge output from the dark current component measuring unit 150.

By using the informing signal generated in this way, the imaging apparatus 10 according to this embodiment can perform imaging with an exposure time that increases contrast while keeping deterioration in image quality within an allowable range. In other words, the user can easily determine an appropriate timing for stopping the exposure. In other words, the imaging apparatus 10 is capable of updating an informing signal in real time using the quantity of dark charge that is being actually measured during the exposure, and is thus capable of stopping exposure at an appropriate timing.

The image processing unit 170 generates image data (hereinafter also referred to as shot image data) using pixel signals output from the valid pixel unit 101 through the selection of the read line selecting unit 140, and performs various types of image processing on the generated shot image data. For example, the image processing unit 170 performs, on the shot image data, a scaling-up process and a scaling-down process of an image to be displayed on the display unit 180, a clipping process, a compression process for recording the shot image data onto the image recording unit 190, etc. The image processing unit 170 may perform all or part of these processes (image processing) on an image, and may perform other image processing (for example, a white balance adjusting process, a gamma compressing process, a YC conversion process, etc.) on an image.

The display unit 180 is, for example, a view finder which informs the user of a remaining exposure time using a generated informing signal, each time an informing signal is generated by the display signal generating unit 160. More specifically, the display unit 180 informs the user of the remaining exposure time by displaying a graphic symbol (a later-described column-shaped gauge in this embodiment) indicating, as the percentage, the difference between the quantity of dark charge measured by the dark current component measuring unit 150 and the maximum quantity of dark charge specified by the user, in the maximum quantity of dark charge.

Figure 2:
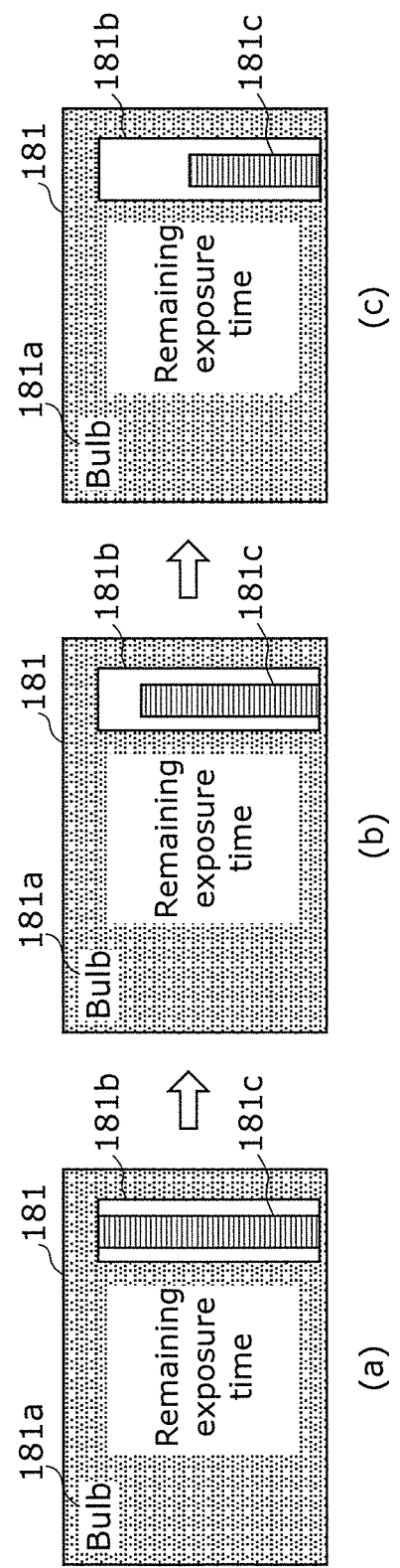
FIG. 2 illustrates examples of remaining exposure times displayed on a display unit during long exposure shooting in Embodiment 1.

Here, a display example of a remaining exposure time displayed on the display unit 180 is described with reference to FIG. 2. FIG. 2 illustrates examples of remaining exposure times displayed on the display unit 180 during long exposure shooting in this embodiment.

As illustrated in the diagram, in the long exposure shooting, the display unit 180 displays "Bulb" as display 181a indicating that bulb shooting is being performed on a display screen 181 of the display unit 180. In addition, the display unit 180 displays, on the display screen 181, a remaining time display window 181b for informing a remaining exposure time. A column-shaped gauge 181c is displayed on the remaining time display window 181b.

As illustrated in (a) of the diagram, this column-shaped gauge 181c is full in the remaining time display window 181b immediately after long exposure shooting is started. Subsequently, as illustrated in (b) and (c) of the diagram, the column-shaped gauge 181c decreases as the shooting progresses. In other words, the display unit 180 displays the percentage indicating the difference between the quantity of dark charge measured by the dark current component measuring unit 150 and the maximum quantity of dark charge, in the maximum quantity of dark charge, as the percentage of the height of the column shaped gauge 181c in the height of the remaining time display window 181b.

In this way, the imaging apparatus 10 according to this embodiment displays the column-shaped gauge 181c indicating the percentage of the difference between the measured quantity of dark charge and the maximum quantity of dark charge, in the maximum quantity of dark charge. In this way, the user can intuitively recognize the remaining exposure time from the displayed column-shaped gauge 181c. Thus, the possibility that the user misses the appropriate timing for stopping the exposure is further reduced. In other words, the imaging apparatus 10 can update the height of the column-shaped gauge 181c in real time using the quantity of dark charge that is currently being measured in the exposure, which allows the user to stop the exposure at the appropriate timing.

The image recording unit 190 is, for example, a memory for storing image data generated by the image processing unit 170. In addition, the image recording unit 190 temporarily stores image data that is being processed by the image processing unit 170 and image data that has been processed. In short, the image recording unit 190 stores the image data in order to realize image processing in the image processing unit 170.

[1-1-2. Configuration of Solid-State Imaging Device]

Next, a configuration of the above-described solid-state imaging device 100 is described with reference to FIGS. 3 and 4.

Figure 3:
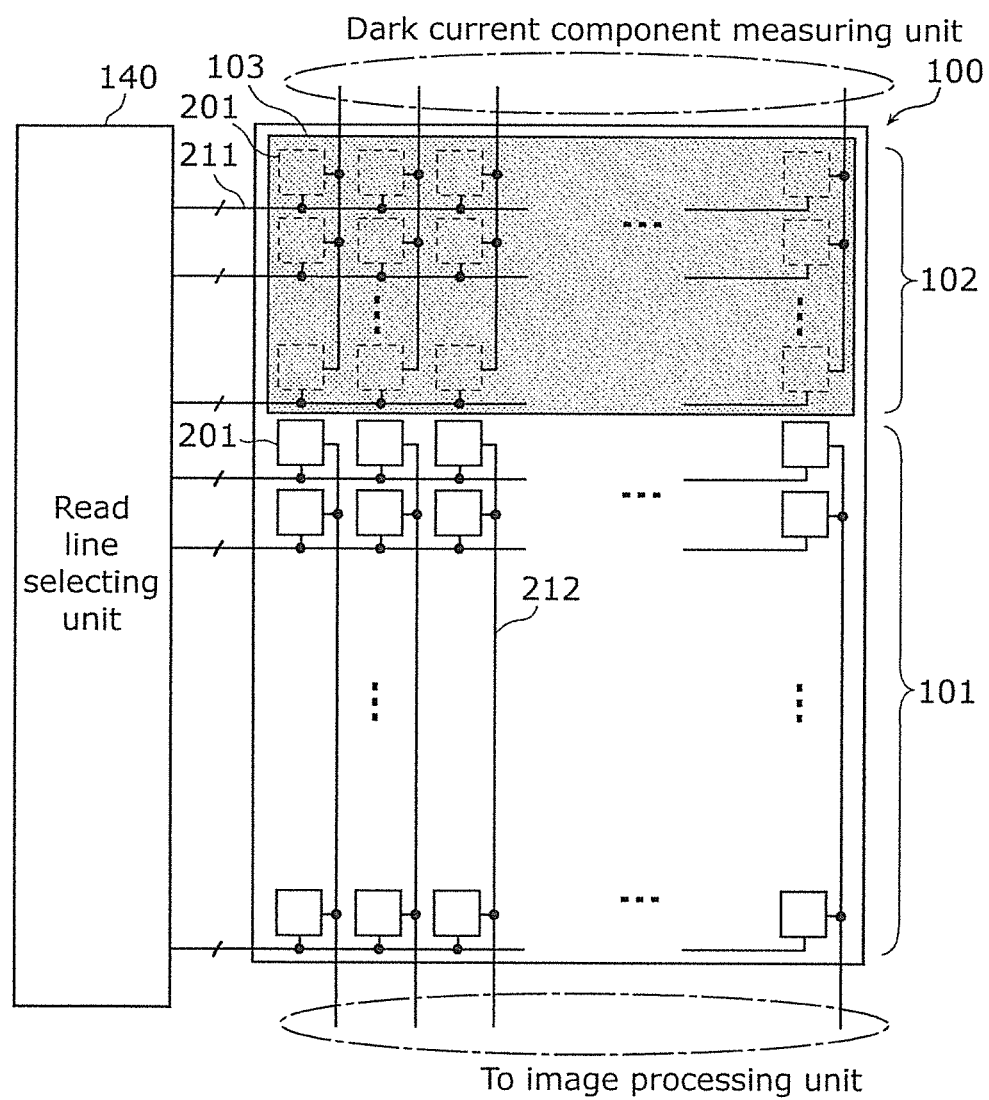
FIG. 3 illustrates a schematic layout of a configuration of a solid-state imaging device in Embodiment 1.

FIG. 3 is a layout diagram schematically illustrates the configuration of the solid-state imaging device 100 in this embodiment. FIG. 4 is a partly enlarged view of FIG. 3, for illustrating the configuration of the solid-state imaging device 100 in this embodiment in detail. It is to be noted that FIG. 3 also illustrates the read line selecting unit 140 by sequentially selecting one or more horizontal lines of the solid-state imaging device 100, and causes each of the pixels in each selected horizontal line to output a pixel signal. In FIG. 4, vertical signal lines 212 are not illustrated.

As illustrated in FIG. 3, the solid-state imaging device 100 includes a plurality of pixels 201 arranged in rows and columns, a plurality of read control line 211 each provided for a corresponding one of the horizontal lines, and a plurality of vertical signal lines 212 each provided for a corresponding one of the columns.

Each of the plurality of read control lines 211 supplies pixel read pulses output from the read line selecting unit 140 to the respective pixels 201 in the corresponding horizontal line 201. In this way, pixel signals are output from the respective pixels 201 in the horizontal line selected by the read line selecting unit 140. More specifically, as illustrated in FIG. 4, each of sets of the plurality of read control lines 211 (three lines in this embodiment) provided for each horizontal line supplies a pulse TX, a pulse RX, and a pulse SEL to each of the pixels 201 corresponding to the horizontal line. It is to be noted that the pulse TX, the pulse RX, and the pulse SEL are collectively referred to as pixel read pulses.

The vertical signal line 212 transmits the pixel signals output from the pixels 201 through the selection by the read line selecting unit 140 to the dark current component measuring unit 150 and the image processing unit 170.

Here, OB pixel unit 102 including a plurality of rows of pixels 201 in the solid-state imaging device 100 is shielded by a shielding film 103 arranged to cover the pixels 201. In this way, the light from the subject does not enter the pixels 201 of the OB pixel unit 102. Thus, pixel signals output from the pixels 201 of the OB pixel unit 102 correspond to dark charge generated by dark current of the solid-state imaging device 100.

On the other hand, since the valid pixel unit 101 is not shielded, light from a subject enters the pixels 201 in the valid pixel unit 101. Thus, the pixel signals output from the pixels 201 in the valid pixel unit correspond to the luminance of an image of the subject.

[1-1-3. Configuration of Pixel]

Figure 5A:
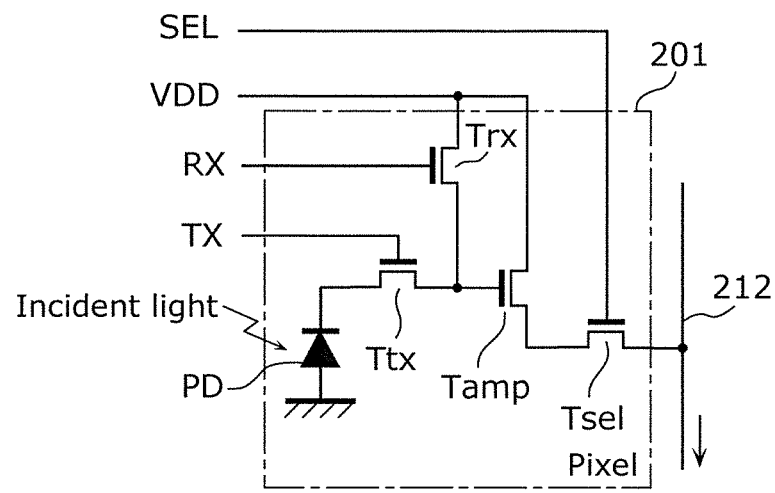
FIG. 5A is a circuit diagram illustrating a configuration of a pixel in Embodiment 1.

Next, the configuration of each of the pixels 201 arranged in the solid-state imaging device 100 is described with reference to FIG. 5A. FIG. 5A is a circuit diagram illustrating a configuration of a pixel 201 in this embodiment.

As illustrated in the diagram, the pixel 201 includes a photodiode PD, a transfer transistor Ttx, a reset transistor Trx, a source follower transistor Tamp, and a selection transistor Tsel.

The photodiode PD performs photoelectric conversion on incident light to generate charge the quantity of which corresponds to the incident light, and stores the generated light.

The transfer transistor Ttx is a switch transistor for transferring the charge stored in the photodiode PD to a floating diffusion that is an input of the source follower transistor Tamp. This transfer transistor Ttx becomes conductive (turns ON) by setting a pulse TX to H (high) level, and becomes non-conductive (turns OFF) by setting a pulse TX to L (low) level.

The reset transistor Trx is a switch transistor for resetting the charge of the input (gate) of the source follower transistor Tamp to a power supply (VDD) level. This reset transistor Trx becomes conductive by setting a pulse RX to H level, and becomes non-conductive by setting a pulse RX to L level.

The source follower transistor Tamp composes a source follower circuit, together with a load (not illustrated, for example, a current source or the like) connected to the vertical signal line 212.

The selection transistor Tsel is a switch transistor for transferring output from the source follower transistor Tamp to the vertical signal line 212 through the selection by the read line selecting unit 140. In other words, the selection transistor Tsel outputs a pixel signal that is a voltage corresponding to charge generated by the photodiode PD through the selection by the read line selecting unit 140. The selection transistor Tsel becomes conductive by setting a pulse SEL to H level, and becomes non-conductive by setting a pulse SEL to L level.

[1-1-4. Operation of Outputting Pixel Signal]

The pixel 201 configured in this way outputs a pixel signal triggered by pixel read pulses (a pulse TX, a pulse RX, and a pulse SEL) supplied from the read line selecting unit 140. Hereinafter, operations of outputting a pixel signal are described with reference to FIG. 5B.

Figure 5B:
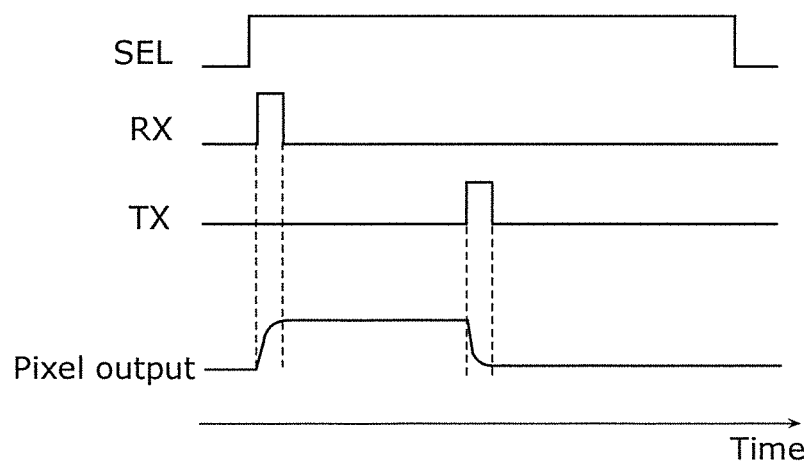
FIG. 5B is a timing chart illustrating an output operation of a pixel signal by a reading line selecting unit in Embodiment 1.

FIG. 5B is a timing chart indicating operations of outputting a pixel signal performed by the read line selecting unit 140. The diagram illustrates the pulse SEL, the pulse RX, the pulse TX, and the voltage (referred to as pixel output in the diagram) of the vertical signal line 212, from top of the diagram in this listed order.

As illustrated in the diagram, the read line selecting unit 140 resets the input of the source follower transistor Tamp by setting the pulse RX to H in a state where the pulse SEL is set to H. In other words, a pixel output level is reset. Subsequently, by setting the pulse RX to L and then setting the pulse TX to H, charge stored in the photodiode PD is transferred to the input of the source follower transistor Tamp. In other words, the pixel output level is changed by the voltage corresponding to the charge stored in the photodiode PD.

In this way, the pixel 201 outputs, as pixel signals, variation in voltage corresponding to the charge stored in the photodiode PD, triggered by the pixel read pulses.

[1-2. Operations]

Operations at the time of bulb shooting performed by imaging apparatus 10 configured as described above are described below. The imaging apparatus 10 may be capable of performing normal shooting with short exposure (for example, 1 second or below) in addition to bulb shooting described below.

[1-2-1. Outline of Operations in Bulb Shooting]

Figure 6:
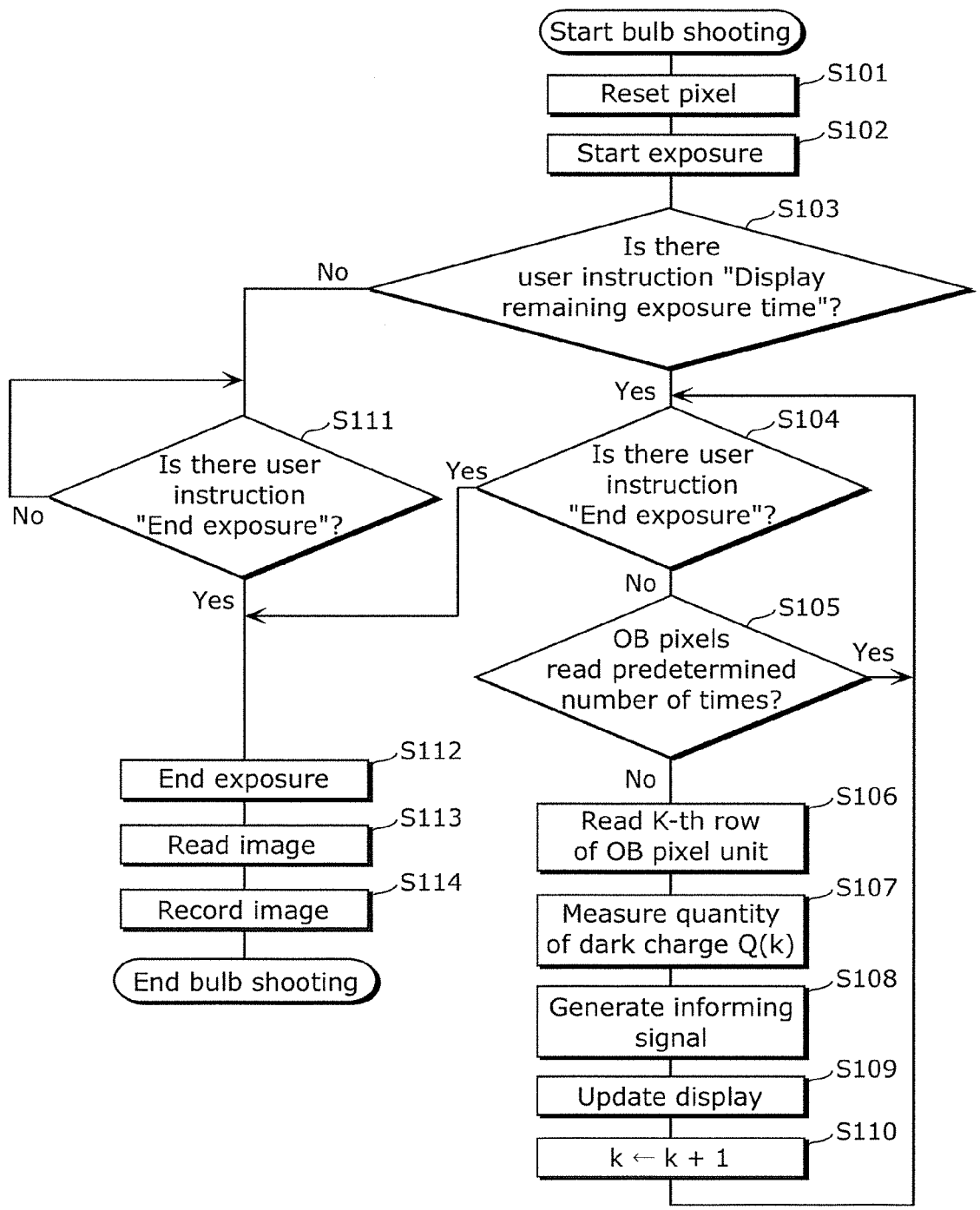
FIG. 6 is a flowchart of operations at bulb shooting by the imaging apparatus in Embodiment 1.

Here, the outline of operations at the time of bulb shooting performed by the imaging apparatus 10 is described with reference to FIG. 6. FIG. 6 is a flowchart of operations at the time of bulb shooting performed by the imaging apparatus 10 in this embodiment.

First, the exposure control unit 130 causes an electronic shutter operation by the solid-state imaging device 100 to reset remaining charge stored in the respective pixels 201 of the solid-state imaging device 100 (S101). This electronic shutter operation is realized by, for example, setting the RX pulse and the TX pulse to H level at the same time.

Next, the exposure control unit 130 opens a mechanical shutter 131, and thereby starts exposure on the solid-state imaging device 100 (S102).

Next, the dark current measurement control unit 120 determines whether or not an instruction "Display remaining exposure time" has been received from a user (S103). More specifically, the dark current measurement control unit 120 determines whether or not measurement of dark charge is allowed according to the instruction from the user.

In the case where the instruction "Display the remaining exposure time" has been received (Yes in S103), the dark current measurement control unit 120 determines presence or absence of an instruction "End exposure" from the user (S104).

When it is determined that there is no such instruction "End exposure" (No in S104), the dark current component measuring unit 150 determines whether or not the number of times of read from the OB pixel unit 102 has reached a predetermined number of times (S105).

When the number of times of read from the OB pixel unit 102 has not reached the predetermined number of times (No in S105), the read line selecting unit 140 reads the k-th pixel row of the OB pixel unit 102 (S106). More specifically, the read line selecting unit 140 selects the k-th pixel row, and causes each of the pixels 201 in the selected pixel row to output a pixel signal. On the other hand, when the number of times of read from the OB pixel unit 102 has reached the predetermined number of times (Yes in S105), a return is made to the process (S104) for determining the presence or absence of the instruction "End the exposure".

Next, the dark current component measuring unit 150 measures the quantity of dark charge (S107). More specifically, the quantity of dark charge Q(k) generated in the k-th horizontal line due to dark current in the solid-state imaging device 100 is measured, using the pixel signals output from the respective pixels 201 in the k-th horizontal line through the selection by the read line selecting unit 140. Here, for example, Q(k) is calculated by averaging the pixel signals in the output one horizontal line. It is to be noted that Q(k) may be a median value or a maximum value of the pixel signals in the one horizontal line.

Next, the display signal generating unit 160 generates an informing signal for informing the user of a remaining exposure time (S108). In other words, the display signal generating unit 160 generates the informing signal using the difference between the quantity of dark charge Q(k) measured by the dark current component measuring unit 150 and the maximum quantity of the dark charge.

Next, the display unit 180 updates the display (S109) to thereby present the remaining exposure time to the user. More specifically, the display unit 180 informs the user of the remaining exposure time using the informing signal generated by the display signal generating unit 160.

Next, the read line selecting unit 140 increments the horizontal line number of the OB pixel unit 102 which performs reading (S110), and returns to the process (S104) for determining the presence or absence of the instruction "End exposure".

The imaging apparatus 10 repeats the processes S104 to S110 until the instruction "End exposure" is made by the user (Yes in S104).

In addition, in the process S103, when the instruction "Display the remaining exposure time" has not been received (No in S103), the dark current measurement control unit 120 determines the presence or absence of the instruction "End exposure" (S111), and repeats the determination until the instruction "End exposure" is made (until the answer of S111 becomes Yes).

Subsequently, when the instruction "End exposure" is made by the user (Yes in S104 or Yes in S111), the exposure control unit 130 closes the mechanical shutter 131 and ends (stops) the exposure (S112).

Next, the read line selecting unit 140 reads an image from the valid pixel unit 101 (S113). More specifically, the read line selecting unit 140 sequentially selects one or more pixel rows of the valid pixel unit 101, and causes each of the pixels 201 in each selected pixel row to output a pixel signal.

Lastly, the image recording unit 190 ends the bulb shooting operation by recording (S114) the shot image. More specifically, the image processing unit 170 generates shot image data using the pixel signals output from the valid pixel unit 101, and records the generated shot image data onto the image recording unit 190.

In this way, in the bulb shooting, the imaging apparatus 10 performs: a row selecting process (S106) for selecting at least one horizontal line of the OB pixel unit 102, and causing the respective pixels 201 of the selected at least one horizontal line to output pixel signals; and a dark charge measuring process (S107) for measuring the quantity of dark charge generated from dark current of the solid-state imaging device 100, using the pixel signals output in the row selecting process (S106), and repeats the row selecting process (S106) and the dark charge measuring process (S107) during the exposure of the solid-state imaging device 100 while changing the pixel row to be selected in the row selecting process (S106).

[1-2-2. Measurement of the Quantity of Dark Charge]

The quantity of dark charge measured in this way is described with reference to FIG. 7. FIG. 7 is a diagram for explaining quantities of dark charge measured by a dark current component measuring unit 150 in this embodiment.

As illustrated in the diagram, each of the pixels 201 in the first row of the OB pixel unit 102 stores dark charge from the time when the exposure is started, a pulse for reading pixels is supplied after time T1 (=TI) from the start of the exposure, and a pixel signal is output, in addition, each of the pixels 201 in the second row of the OB pixel unit 102 stores dark charge from the time when the exposure is started, a pulse for reading pixels is supplied after time T2 (=2*TI) from the start of the exposure, and a pixel signal is output.

From each of the following pixel rows, a pixel signal is read out at a measurement interval of time TI. In other words, each of the pixels 201 in the n-th row of the OB pixel unit 102 stores dark charge from the time when the exposure is started, a pulse for reading pixels is supplied after time Tn (=n*TI) from the start of the exposure, and a pixel signal is output.

Here, the measurement interval TI of dark charge is set to be shorter (for example, from several tens of milliseconds to several hundreds of milliseconds) than the exposure time in bulb shooting.

In this way, the imaging apparatus 10 according to this embodiment sequentially selects one or more pixel rows of the OB pixel unit 102 at timings different from each other during exposure of the solid-state imaging device 100, causes each of the pixels 201 in the selected pixel row to output an image signal, and, each time the pixel signal is output from the OB pixel unit 102, measures the quantity of dark charge generated from dark current of the solid-state imaging device 100 using the pixel signal. In this way, it is possible to control a timing for stopping the exposure with tracking variation in the quantity of dark charge that occurs. Thus, it is possible to stop the exposure at an appropriate timing.

[1-2-3. Operation of Outputting Pixel Signal]

Figure 8A:
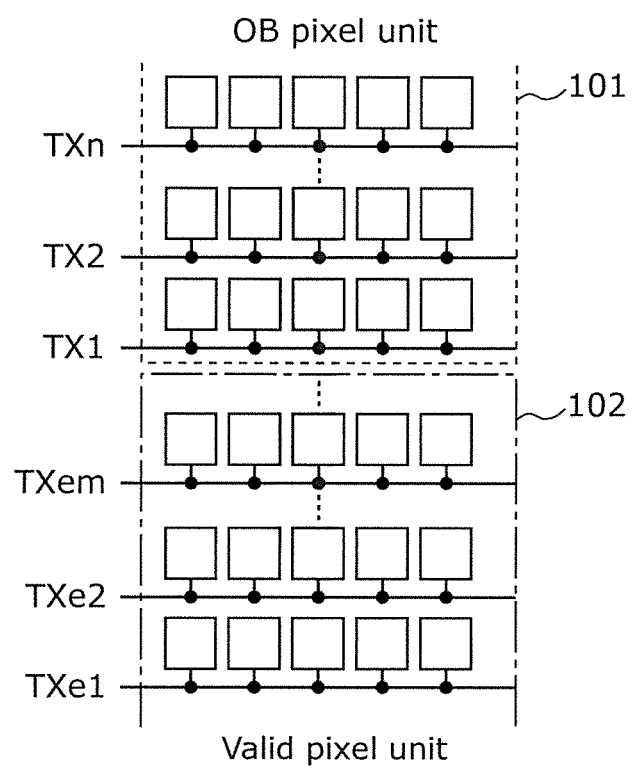
FIG. 8A is a layout diagram of a configuration of the solid-state imaging device for explaining operations for reading pixel signals in Embodiment 1.
Figure 8B:
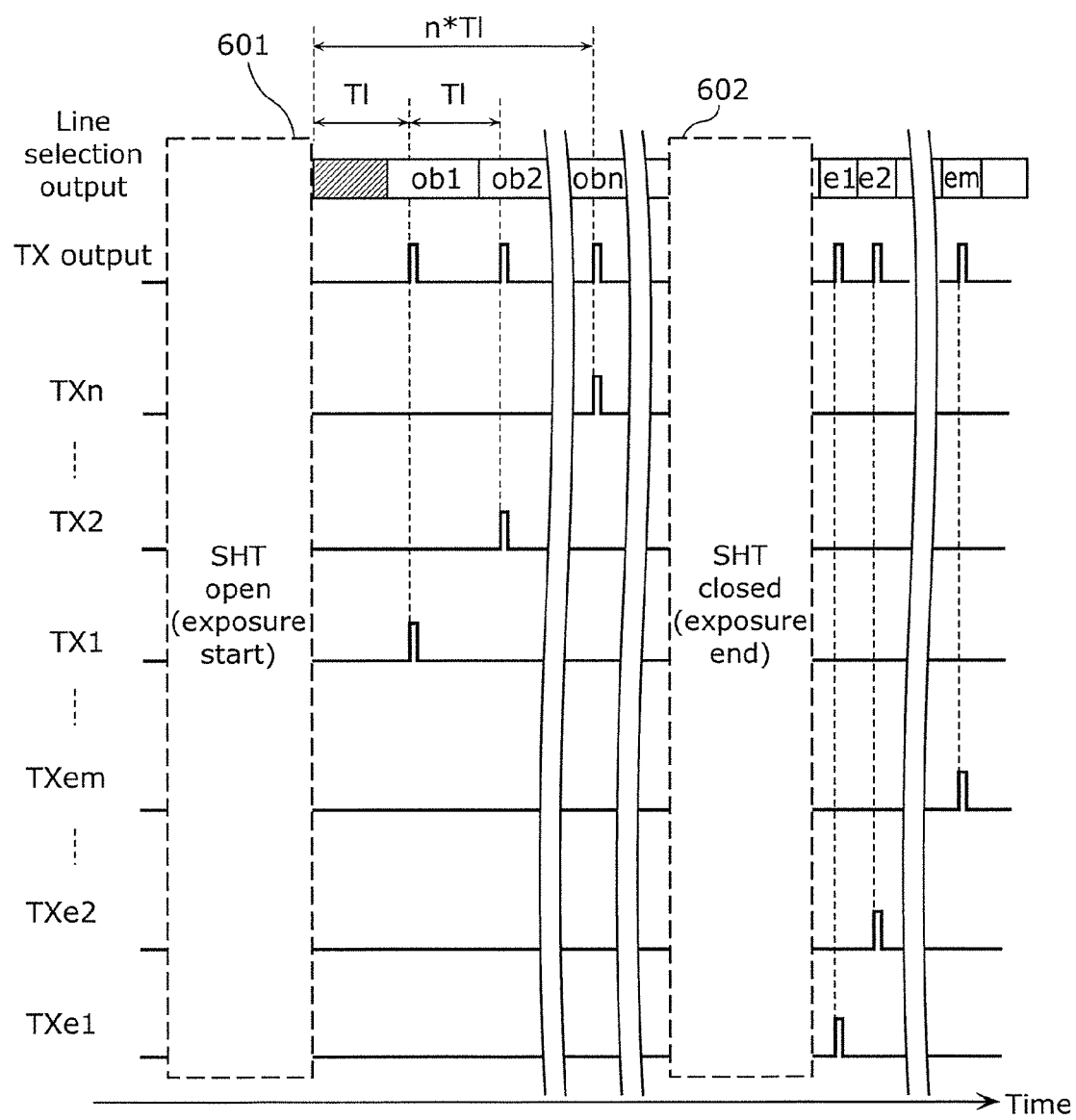
FIG. 8B is a timing chart illustrating reading operations of pixel signals in Embodiment 1.

Next, operations of reading pixel signals from the solid-state imaging device 100 are described in detail with reference to FIG. 8A and FIG. 8B. FIG. 8A is a layout diagram for illustrating a configuration of the solid-state imaging device 100, for explaining operations of reading pixel signals in this embodiment. FIG. 8B is a timing chart illustrating operations of reading pixel signals in this embodiment, FIG. 8B illustrates: rows (the OB pixel unit: ob1, ob2, and obn; and the valid pixel unit 101: e1, e2, and em) selected by the reading line selecting unit 140; a TX pulse output from the exposure control unit 130; TX pulses (TX1, TX2, and TXn) supplied to the first, second, and n-th rows of the OB pixel unit 102 illustrated in FIG. 8A; and TX pulses (TXe1, TXe2, and TXem) supplied to the first, second, and m-th rows of the valid pixel unit 101 illustrated in FIG. 8A.

As illustrated in FIG. 8B, the mechanical shutter 131 is opened in an exposure start period 601, and exposure is started. As described above, remaining charge stored in each of the pixels 201 of the solid-state imaging device 100 is reset by an operation of an electronic shutter of the solid-state imaging device 100 before the start of the exposure (before the exposure start period 601).

Subsequently, one or more rows are sequentially selected starting with the first row of the OB pixel unit 102 at an interval of TI, and a TX pulse is output to the selected row, and thereby the pixel signals of the OB pixel unit 102 are sequentially read out on a per row basis at the interval of TI. In other words, the pixel rows of the OB pixel unit 102 are sequentially selected at the interval of TI, and the pixel signals are read out from the pixels 201 of the selected pixel row.

Next, the mechanical shutter 131 is closed in the exposure end period 602 to end (stop) the exposure.

After the exposure is ended, rows in the valid pixel unit 101 are sequentially selected and TX pulses are output, and thereby pixel signals are read out from the respective pixels 201 of the valid pixel unit 101.

In this way, the read line selecting unit 140 reads out pixel signals from the OB pixel unit 102 at timings different from each other in the exposure, and after the end of the exposure, pixel signals are read out from the valid pixel unit 101.

[1-2-4. Generation of Informing Signal]

Figure 9:
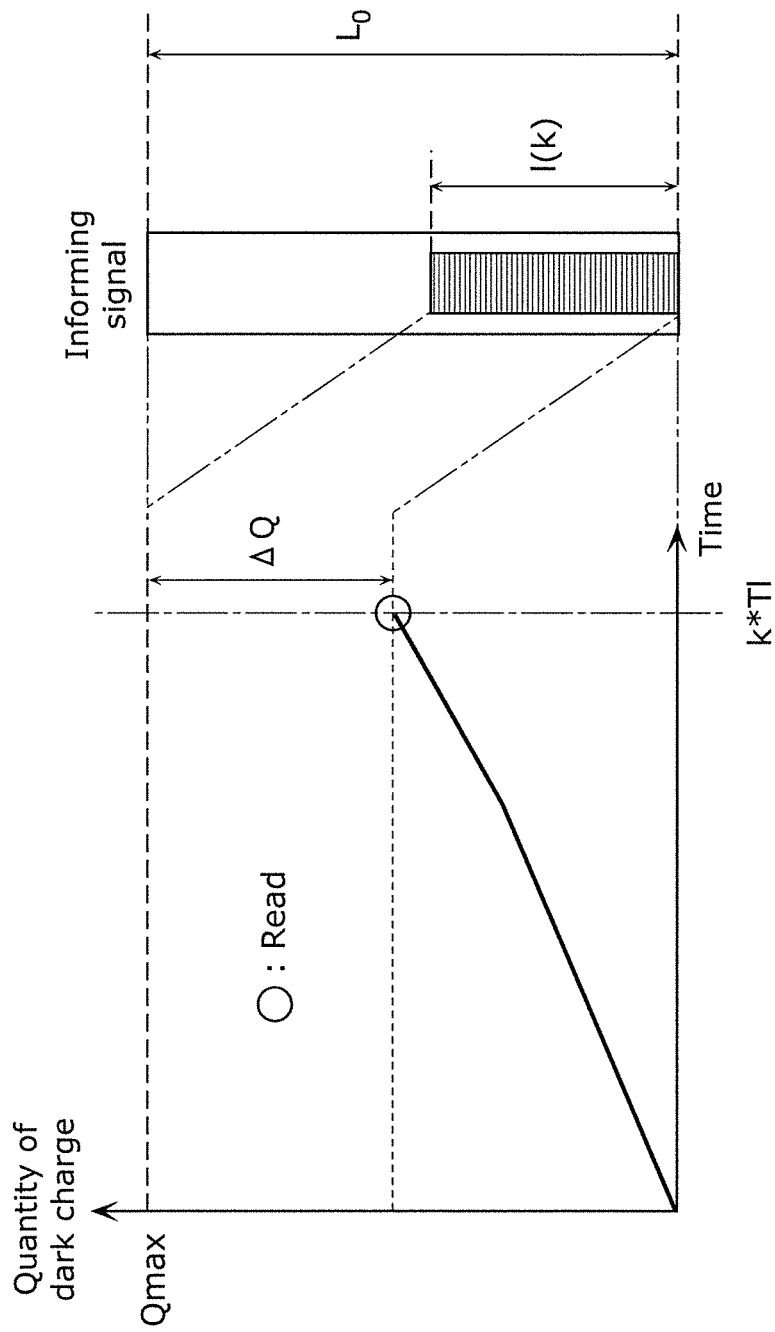
FIG. 9 is a diagram for explaining an operation for generating an informing signal in Embodiment 1.
Figure 10:
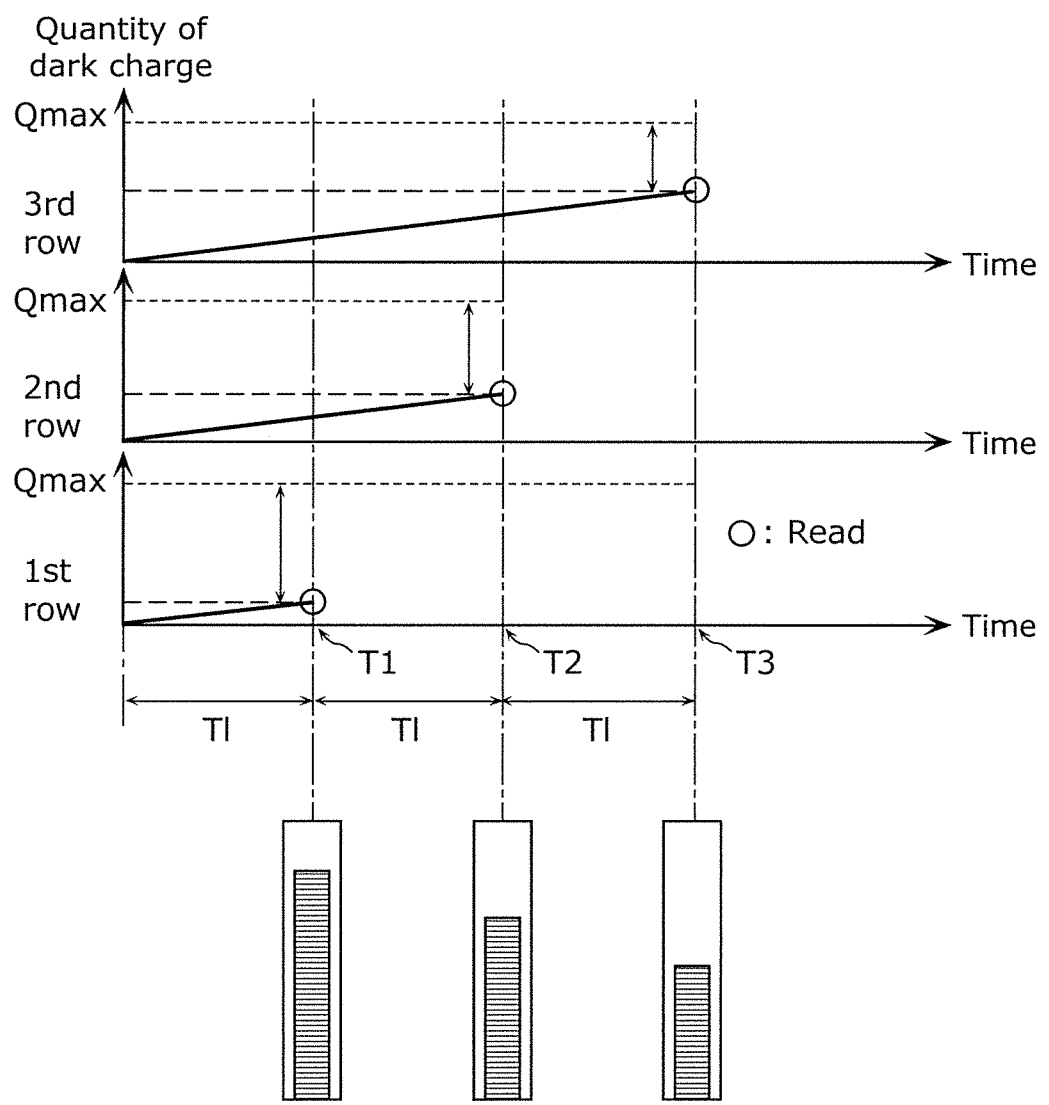
FIG. 10 is a diagram illustrating time-series changes of informing signals in the case where the temperature of the solid-state imaging device in Embodiment 1 does not change.
Figure 11:
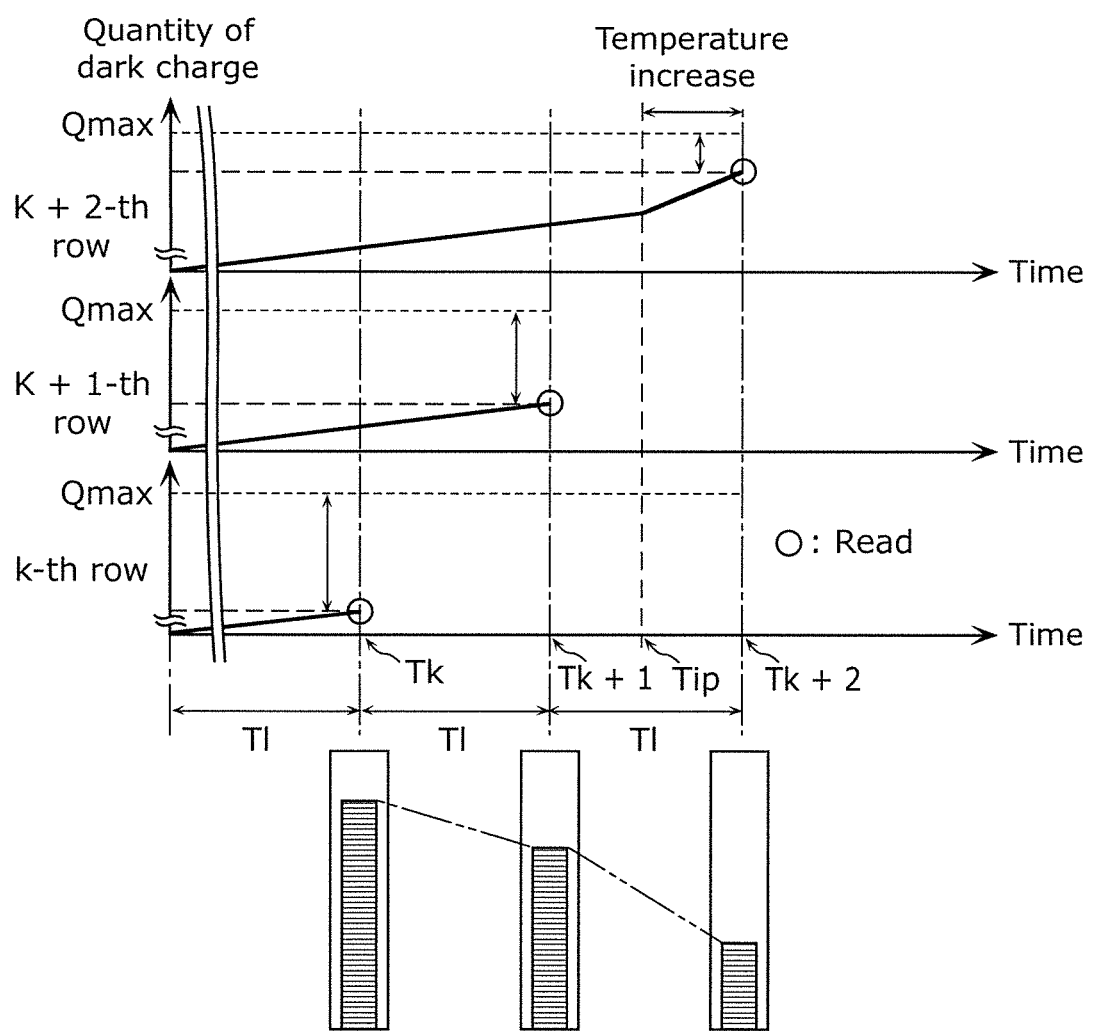
FIG. 11 is a diagram illustrating time-series changes of informing signals in the case where the temperature of the solid-state imaging device in Embodiment 1 changes.

Next, operations of generating informing signals by the display signal generating unit 160 are described in detail with reference to FIGS. 9 to 11. FIG. 9 is a diagram for explaining an operation for generating an informing signal in this embodiment. FIG. 10 is a diagram illustrating time-series changes of informing signals in the case where the temperature of the solid-state imaging apparatus 100 in this embodiment does not change. FIG. 11 is a diagram illustrating time-series changes of informing signals in the case where the temperature of the solid-state imaging apparatus 100 in this embodiment changes.

More specifically, FIG. 9 shows: a graph indicating the quantity of dark charge stored in a pixel 201 in a k-th row in the OB pixel unit 102 with respect to time elapsed from the start of exposure; and a column-shaped gauge corresponding to the informing signal generated using the pixel signal read out from each pixel 201 in the k-th row after the elapse of time k*TI from the start of the exposure. On the other hand, FIG. 10 shows: a graph indicating the quantity of dark charge stored in pixels 201 in 1st to 3rd rows in the OB pixel unit 102 with respect to time elapsed from the start of exposure; and column-shaped gauges corresponding to the informing signals generated using the pixel signals read out from the pixels 201 in the 1st to 3rd rows. In addition, FIG. 11 shows: a graph indicating the quantity of dark charge stored in pixels 201 in k-th to k+2-th rows in the OB pixel unit 102 with respect to time elapsed from the start of exposure; and column-shaped gauges corresponding to the informing signals generated using the pixel signals read out from the pixels 201 in the k-th to k+2-th rows.

Here, as illustrated in FIG. 11, the temperature of the solid-state imaging device 100 increases at and after time Tip.

As described above, the display signal generating unit 160 generates an informing signal indicating a remaining exposure time, using the difference between the measured quantity of dark charge and the maximum quantity of dark charge, each time the quantity of dark charge is measured by the dark current component measuring unit 150. More specifically, the display signal generating unit 160 outputs, as an informing signal, the percentage indicating the difference between the quantity of dark charge measured by the dark current component measuring unit 150 and the maximum quantity of dark charge specified by the user to the display unit 180. Thus, a column-shaped gauge 181c indicating a remaining exposure time is displayed on the remaining time display window 181b of the display unit 180.

In other words, when the quantity of dark charge measured by the dark current component measuring unit 150 is Q(k) and the maximum quantity of dark charge specified by the user is Qmax, the length l(k) of the column-shaped gauge displayed by reading out the pixel signals of the pixels 201 in the k-th row of the OB pixel unit 102 is represented according to the Expression below.

$$l(k) = \left(1 - \frac{Q(k) - Q_{dark}(k)}{Q_{max}}\right)L_0 \qquad \text{[Math. 1]}$$

Here, Qdark(k) is an average value of the pixel signals of the respective pixels 201 in the k-th row of the OB pixel unit 102 when an exposure time is 0. The Qdark(k) is obtained, for example, only by outputting the pixel signals in a state where a TX pulse is fixed to L level. In addition, Qmax does not include Qdark(k). More specifically, Q(k) is an average value of the pixel signals output from the one horizontal line.

In this way, in the remaining time display window 181b of the display unit 180, the column-shaped gauge 181c whose height reduces with increase of the dark charge measured by the dark current component measuring unit 150. Thus, the user can intuitively recognize the remaining exposure time from the displayed column-shaped gauge 181c.

In short, as described above, the display signal generating unit 160 (the remaining time generating unit) generates an informing signal (remaining time information) indicating a remaining exposure time using the difference between the measured quantity of dark charge and the maximum quantity of dark charge each time the quantity of dark charge is measured (at a measurement interval TI in this embodiment) by the dark current component measuring unit 150. As described above, the display unit 180 (informing unit) informs the user of the remaining exposure time using an informing signal each time an informing signal (remaining time information) is generated (at a measurement interval TI in this embodiment) by the display signal generating unit 160 (remaining time generating unit).

As illustrated in FIG. 10, the imaging apparatus 10 can display the column-shaped gauge 181c whose height reduces with increase in the quantity of dark charge stored in each of the pixels 201 of the OB pixel unit 102 as time elapses from the start of the exposure. Thus, the user can intuitively recognize the remaining exposure time from the column-shaped gauge 181c updated in real time. Accordingly, the possibility that the user misses an appropriate timing for stopping the exposure is further reduced, and the exposure can be stopped at an appropriate timing.

In addition, the quantity of dark charge generated from dark current of the solid-state imaging device 100 depends on a temperature or the like of the solid-state imaging device 100. As illustrated in FIG. 11, when the temperature of the solid-state imaging device 100 increases during exposure, the quantity of increase per unit time in the quantity of generated dark charge increases compared to the temperature before the increase.

Even when a temperature changes during such exposure, the imaging apparatus 10 according to this embodiment is capable of stopping the exposure at an appropriate timing. The reasons are explained below. The dark current component measuring unit 150 measures the quantity of dark current each time a pixel signal is output, and the display signal generating unit 160 generates an informing signal each time the quantity of dark charge is measured by the dark current component measuring unit 150. Thus, as illustrated in FIG. 11, the height of the column-shaped gauge 181c reflects the temperature change in the exposure in real time. In other words, the column-shaped gauge 181c is capable of tracking the temperature change in the exposure.

Thus, the user can adjust a timing for stopping the exposure tracking variation in the quantity of dark charge that occurs. In other words, even when an environmental change occurs during the exposure, it is possible to stop the exposure at an appropriate timing.

[1-3. Effects Etc.]

As described above, the imaging apparatus 10 reads pixel signals at a plurality of timings different from each other during the exposure, and measures the quantity of dark charge. In this way, it is possible to measure variation in the quantity of dark charge due to environmental change during the exposure. Thus, it is possible to stop exposure at an appropriate timing. In other words, the user of the imaging apparatus is capable of easily determining an appropriate timing for stopping the exposure.

In addition, in this embodiment, the display signal generating unit 160 (remaining time generating unit) generates an informing signal (remaining time information) indicating a remaining exposure time using the difference between the measured quantity of dark charge and the maximum quantity of dark charge each time the quantity of dark charge is measured (at a measurement interval TI in this embodiment) by the dark current component measuring unit 150.

By using the remaining time information generated in this way, it is possible to perform imaging with an exposure time that increases contrast while keeping deterioration in image quality within an allowable range. In short, it is possible to easily determine an appropriate timing for stopping the exposure.

In addition, in this embodiment, the display unit 180 informs the user of a remaining exposure time using a generated informing signal, each time an informing signal is generated by the display signal generating unit 160.

Here, if such a remaining exposure time is not informed, it is difficult for the user to determine a timing for stopping the exposure considering environmental change during the exposure. In other words, in this case, the user may miss the appropriate timing for stopping the exposure. In view of this, by informing the user of the remaining exposure time, the user can recognize the remaining exposure time, and the possibility that the user misses the appropriate timing for stopping the exposure is reduced.

More specifically, the display unit 180 informs the user of the remaining exposure time by displaying a column-shaped gauge 181c indicating the percentage of the difference between the quantity of dark charge measured by the dark current component measuring unit 150 and the maximum quantity of dark charge specified by the user, in the maximum quantity of dark charge.

In this way, the column-shaped gauge 181c indicating the percentage of the difference between the measured quantity of dark charge and the maximum quantity of dark charge, in the maximum quantity of dark charge is displayed, and based on the displayed column-shaped gauge 181c, the user can intuitively recognize the remaining exposure time. Thus, the possibility that the user misses the appropriate timing for stopping the exposure is further reduced, Modification of Embodiment 1

Figure 12:
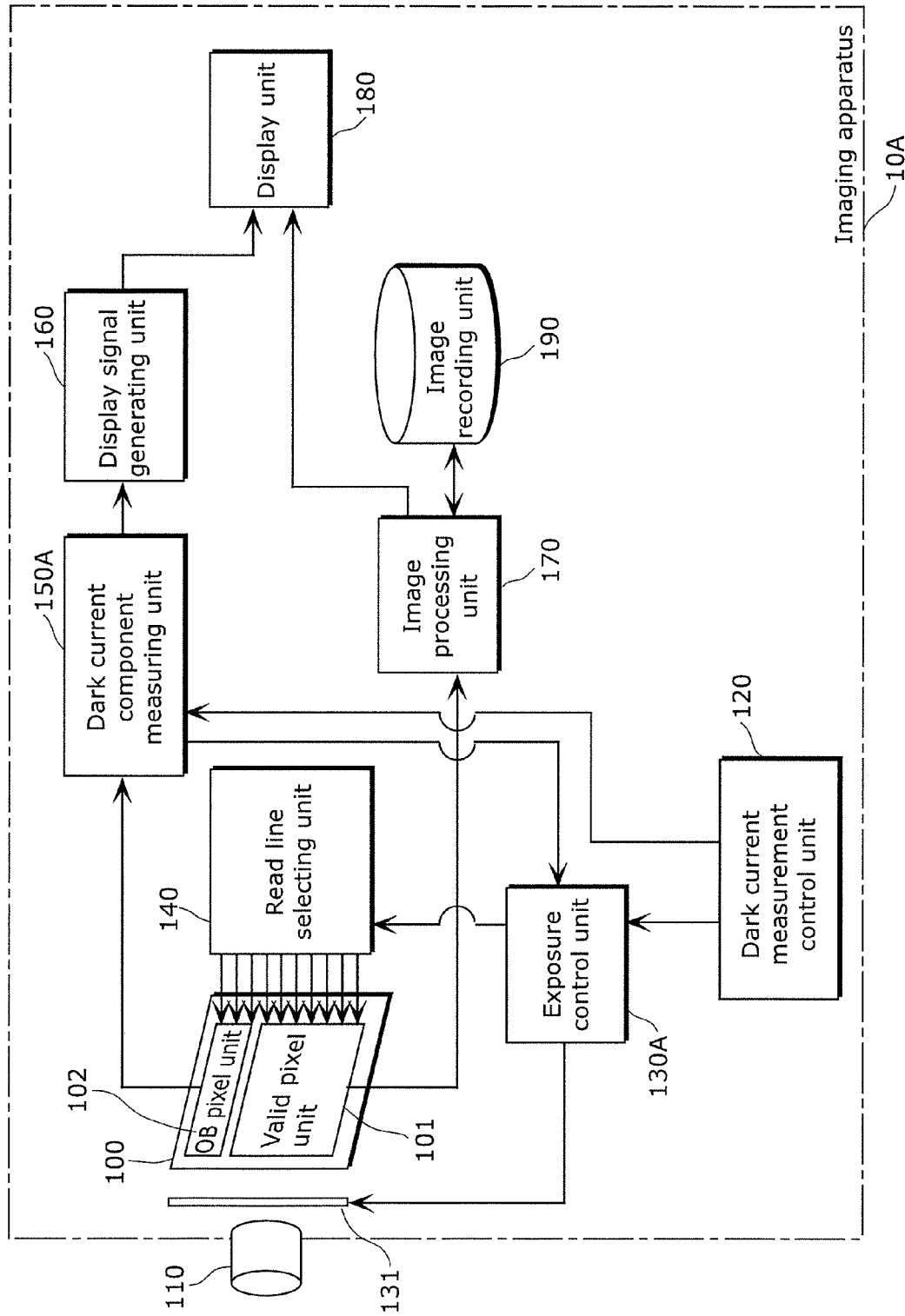
FIG. 12 is a block diagram illustrating a configuration of an imaging apparatus according to a modification of Embodiment 1.

Next, a modification of Embodiment 1 is described with reference to FIG. 12. FIG. 12 is a block diagram indicating a configuration of an imaging apparatus 10A according to this modification.

The imaging apparatus 10A illustrated in the diagram is different from an imaging apparatus 10 according to Embodiment 1 in the point of including a dark current component measuring unit 150A and an exposure control unit 130A instead of the dark current component measuring unit 150 and the exposure control unit 130. The differences of the imaging apparatus 10A from the imaging apparatus 10 are focused on in the descriptions below.

Compared to the dark current component measuring unit 150, when the measured quantity of dark charge is larger than the maximum quantity of dark charge, the dark current component measuring unit 150A outputs, to the exposure control unit 130A, a signal indicating the measured quantity of dark charge is larger than the maximum quantity of dark charge.

Compared to the exposure control unit 130, the exposure control unit 130A stops exposure when the quantity of dark charge measured by the dark current component measuring unit 150A is larger than the maximum quantity of dark charge. More specifically, when a signal indicating that the measured quantity of dark charge is larger than the maximum quantity of dark charge is output from the dark current component measuring unit 150A, the exposure control unit 130A closes the mechanical shutter 131 and ends (stops) the exposure.

In this way, in this modification, the exposure control unit 130A stops exposure when the quantity of dark charge measured by the dark current component measuring unit 150A is larger than the maximum quantity of dark charge.

Here, in the long exposure shooting, the exposure time may depend only on a user operation without being determined in advance or automatically. In this case, when the user cannot perform an operation of stopping the exposure for some reason, a larger quantity of dark charge than intended by the user may occur. Such dark charge may cause image quality deterioration unintended by the user. For this reason, by stopping the exposure when the measured quantity of dark charge is larger than the maximum quantity of charge, the imaging apparatus 10A according to this modification is capable of reducing deterioration in image quality unintended by the user.

Embodiment 2

Next, Embodiment 2 is described with reference to FIG. 13. An imaging apparatus 20 according to this embodiment displays a predicted image on which noise corresponding to dark charge is superimposed before exposure of a solid-state imaging device 100, and the maximum quantity of dark charge is specified by the user who has checked the image.

[2-1. Configuration]

Figure 13:
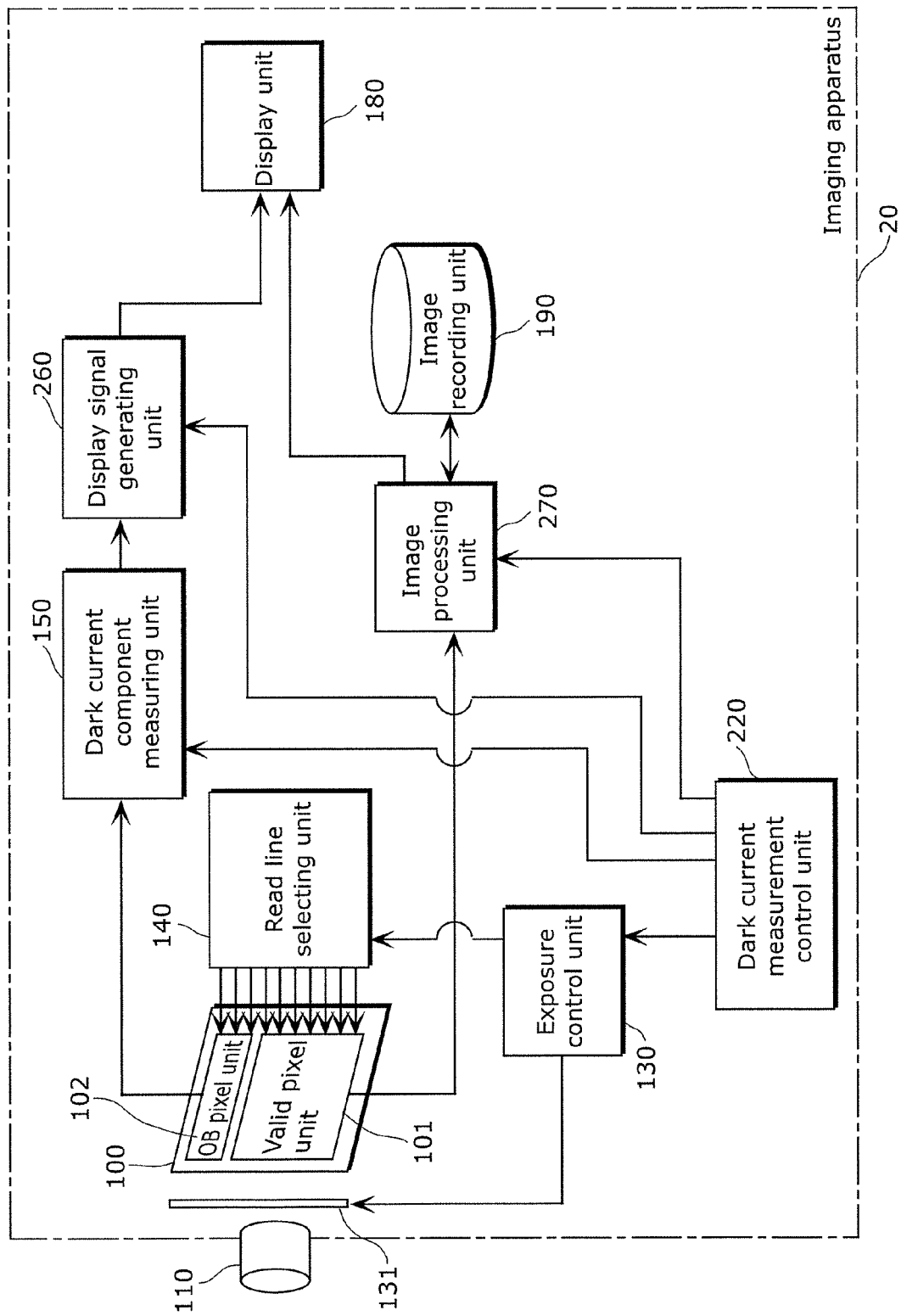
FIG. 13 is a block diagram illustrating a configuration of an imaging apparatus according to Embodiment 2.

FIG. 13 is a block diagram illustrating a configuration of the imaging apparatus 20 according to this embodiment.

The imaging apparatus 20 illustrated in the diagram is different from the imaging apparatus 10 according to Embodiment 1 in the point of including a dark current measurement control unit 220, a display signal generating unit 260, and an image processing unit 270 instead of including the dark current measurement control unit 120, the display signal generating unit 160, and the image processing unit 170. The differences of the imaging apparatus 20 from the imaging apparatus 10 are focused on in the descriptions below.

Compared to the dark current measurement control unit 120, the dark current measurement control unit 220 receives the maximum quantity of dark charge specified by a user, and outputs information indicating the maximum quantity of dark charge to the display signal generating unit 260. In addition, before the exposure of the solid-state imaging device 100, the dark current measurement control unit 220 receives the standard quantity of dark charge which is the quantity of dark charge specified by the user and is to be used by the user as a standard for specifying the maximum quantity of dark charge. Furthermore, the information indicating the standard quantity of dark charge is output to the image processing unit 270.

Compared to the display signal generating unit 160, the display signal generating unit 260 is different in the point that the maximum quantity of dark charge at the time when an informing signal is generated is specified by the user and received by the dark current measurement control unit 220. In other words, in Embodiment 1, the maximum quantity of dark charge is set, for example, based on user's shooting experience. On the other hand, in this embodiment, the maximum quantity of dark charge is set by the user after the user checks a later-described predicted image.

Compared to the image processing unit 170, the image processing unit 270 superimposes, on a sample image, a noise component corresponding to the standard quantity of dark charge that is to be used by the user as a standard for specifying the maximum quantity of dark charge and received by the dark current measurement control unit 220 before the exposure of the solid-state imaging device 100. More specifically, the image processing unit 270 superimposes the noise component on the sample image data recorded on an image recording unit 190, and supplies the sample image data on which the noise component is superimposed to a display unit 180.

In this way, the display unit 180 displays the sample image on which the noise corresponding to the standard quantity of dark charge is superimposed as a predicted image to a display screen 181.

Figure 14:
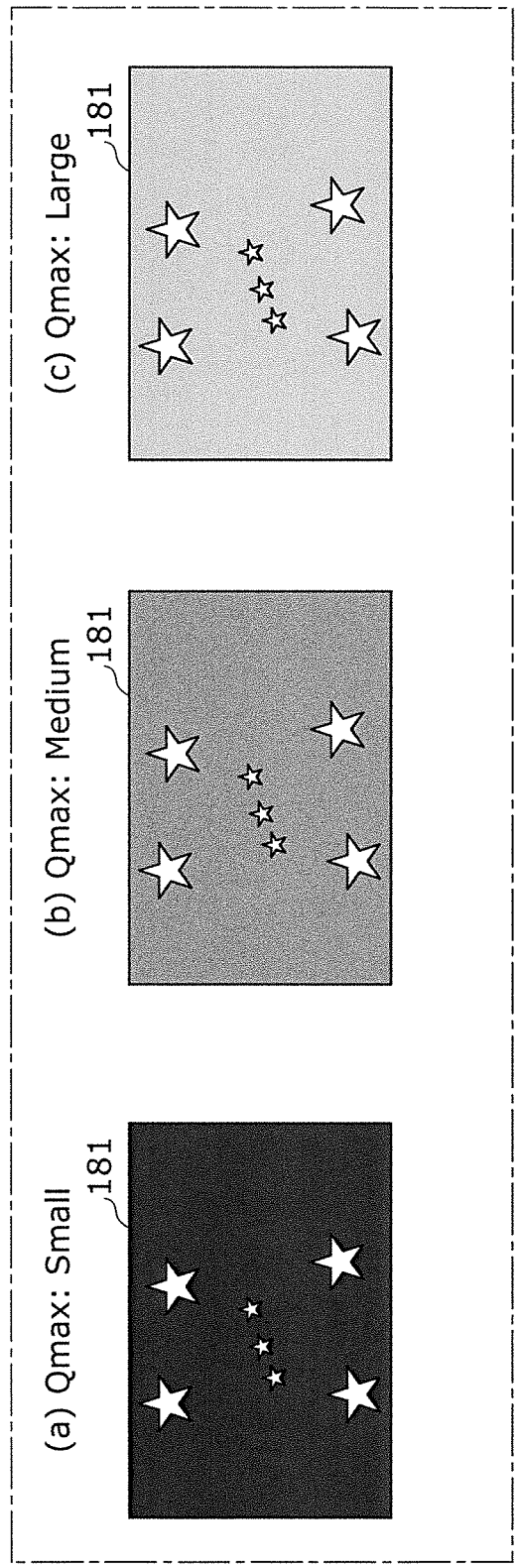
FIG. 14 illustrates examples of predicted images displayed on a display screen of a display unit before exposure.

FIG. 14 illustrates examples of predicted images which are displayed on the display screen 181 of the display unit 180 before exposure in this embodiment. In the diagram, (a) illustrates a predicted image in the case where the maximum quantity of dark charge Qmax is set to small (for example, 20 LSB); (b) illustrates a predicted image in the case where the maximum quantity of dark charge Qmax is set to medium (for example, 50 LSB); and (c) illustrates a predicted image in the case where the maximum quantity of dark charge Qmax is set to large (for example, 100 LSB). In other words, (a), (b), and (c) in the diagram illustrate the predicted images in the case where the standard quantities of dark charge are set to a small level, a medium level, and a large level in the listed order.

As illustrated in the diagram, the larger the maximum quantity of dark charge Qmax becomes, the more the image quality deteriorates due to noise such as white flaw, white spot, shading, etc. In other words, the longer the exposure time becomes, the more the image quality deteriorates due to noise such as white flaw, white spot, shading, etc. On the other hand, the longer the exposure time becomes, the more the contrast increases.

In view of this, the user can set the maximum quantity of dark charge Qmax in the long exposure shooting to a value appropriate for a subject by checking the predicted images in the changeable levels of the maximum quantities of dark charge Qmax before the long exposure shooting.

In this way, the imaging apparatus 20 according to this embodiment displays predicted images on which noise corresponding to dark charge is superimposed before the exposure of the solid-state imaging device 100, and the maximum quantity of the dark charge is specified by the user who has checked the images.

In this way, the user can specify the maximum quantity of dark charge after checking predicted deterioration in image quality and considering the balance between (i) expected contrast, an expected exposure time, etc, and (ii) a deterioration in image quality of an image to be shot by the user. Thus, it is possible to specify the maximum quantity of dark charge, appropriate for the user.

[2-2. Effects Etc.]

As described above, in this embodiment, the image processing unit 270 superimposes, on the sample images, a noise component corresponding to the standard quantity of dark charge that is to be used by the user as a standard for specifying the maximum quantity of dark charge before the exposure of a valid pixel unit 101. In addition, the display unit 180 displays the sample images on which the noise component is superimposed before the exposure of the valid pixel unit 101.

In this way, by displaying a sample image on which a noise component is superimposed, the user can check predicted deterioration in image quality before specification of the maximum quantity of dark charge. Thus, it is possible to specify the maximum quantity of dark charge, appropriate for the user.

It is to be noted that the image processing unit 270 may superimpose a noise component onto an image obtained by imaging a subject just before, instead of the sample images. In other words, the image processing unit 270 may generate an image using a pixel signal output from the valid pixel unit 101 through the selection by a read line selecting unit 140, and superimpose the noise component onto the generated image.

In other words, the image displayed on the display unit 180 is the image obtained by superimposing the noise component corresponding to the measured quantity of dark charge onto the image of the subject that is currently being shot. Thus, it is possible to recognize deterioration in image quality of the image of the subject due to dark current. As a result, it is possible to stop the exposure at the timing more appropriate for the subject than in the case where the image obtainable by superimposing the noise component onto the sample images is displayed.

Embodiment 3

Next, Embodiment 3 is described with reference to FIGS. 15 to 17. An imaging apparatus 30 according to this embodiment displays an image on which a noise component corresponding to the quantity of dark charge during exposure of a solid-state imaging device 100 is superimposed is displayed during the exposure. In this way, the user can stop the exposure at the appropriate timing.

[3-1. Configuration]

Figure 15:
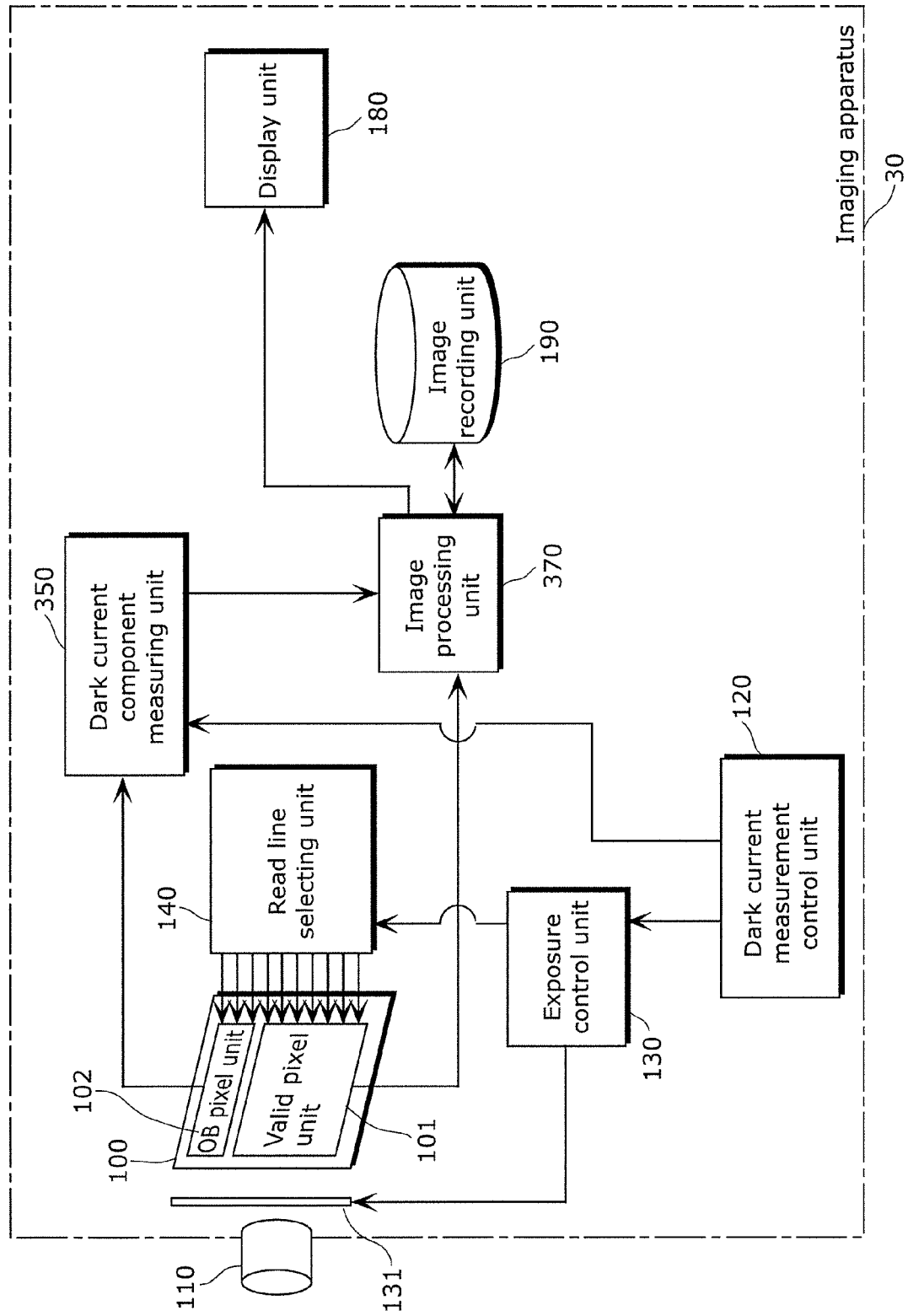
FIG. 15 is a block diagram illustrating a configuration of an imaging apparatus according to Embodiment 3.

FIG. 15 is a block diagram illustrating a configuration of an imaging apparatus 30 according to this embodiment.

Compared to the imaging apparatus 10 according to Embodiment 1, the imaging apparatus 30 illustrated in the diagram does not include the display signal generating unit 160, but includes a dark current component measuring unit 350 and an image processing unit 370 instead of the dark current component measuring unit 150 and the image processing unit 170. The differences of the imaging apparatus 30 from the imaging apparatus 10 are focused on in the descriptions below.

Compared to the dark current component measuring unit 150, the dark current component measuring unit 350 is different in the point of outputting information indicating the measured quantity of dark charge to the image processing unit 370. In other words, the dark current component measuring unit 350 measures the quantity of dark charge using the pixel signal each time a pixel signal is output from the solid-state imaging device 100, and outputs the information indicating the measured quantity of dark charge to the image processing unit 370.

Compared to the image processing unit 170, the image processing unit 370 is different in the point of superimposing, onto a sample image, a noise component corresponding to the measured quantity of dark charge each time the quantity of dark charge is measured by the dark current component measuring unit 350. More specifically, the image processing unit 370 superimposes the noise component on the sample image data recorded on an image recording unit 190, and supplies the sample image data on which the noise component is superimposed to a display unit 180.

In this way, the display unit 180 displays, on the display screen, the sample image on which a noise corresponding to the quantity of dark charge measured by the dark current component measuring unit 350 is superimposed.

Figure 16:
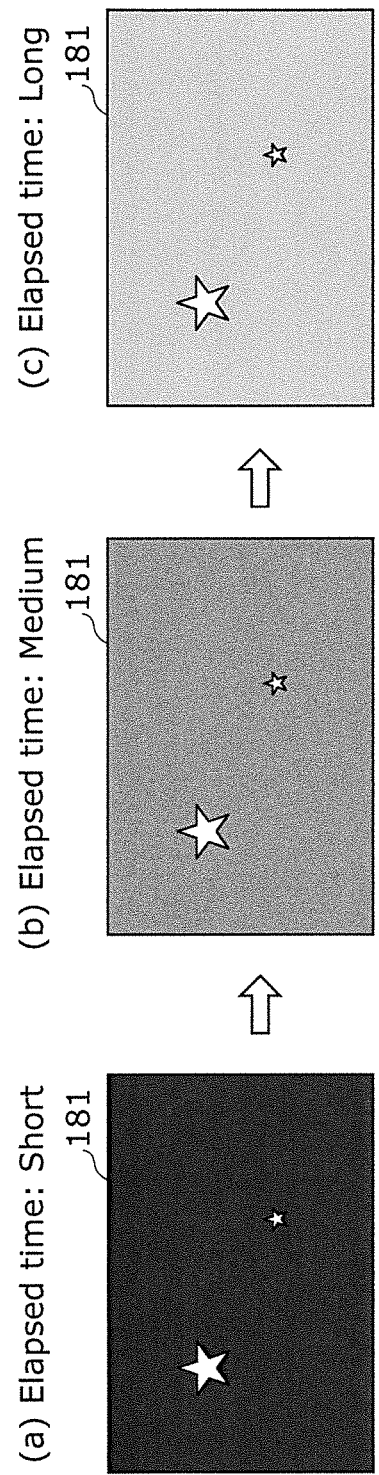
FIG. 16 illustrates examples of images displayed on a display screen of a display unit during exposure.

FIG. 16 illustrates examples of images to be displayed on a display screen 181 of the display unit 180 during the exposure in this embodiment. In the diagram: (a) illustrates an image in the case where elapsed time is short (Elapsed time: Short); (b) illustrates an image in the case where elapsed time is medium (Elapsed time: Medium); and (c) illustrates an image in the case where elapsed time is long (Elapsed time: Long).

As illustrated in the diagram, the larger the elapsed time from the start of the exposure is, the more the image quality deteriorates due to noise such as white flaw, white spot, shading, etc. In other words, the longer the exposure time becomes, the more the image quality deteriorates due to noise such as white flaw, white spot, shading, etc. On the other hand, the longer the exposure time becomes, the more the contrast increases.

Thus, the user can stop the exposure at an appropriate timing by checking a predicted deterioration in image quality during the exposure. In other words, the user can stop the exposure at the appropriate timing after checking the deterioration in image quality in real time and considering the balance between an expected contrast and a deterioration in image quality of an image that the user wants to shoot.

[3-2. Effects Etc.]

As described above, in this embodiment, the image processing unit 370 superimposes, on a sample image, a noise component corresponding to the measured quantity of dark charge each time the quantity of dark charge is measured by the dark current component measuring unit 350, and the display unit 180 displays the image on which the noise component is superimposed.

In this way, by displaying the sample images on each of which the noise component corresponding to the quantity of dark charge measured by the dark current component measuring unit 350 is superimposed, the user can check the predicted deterioration in image quality during the exposure. Thus, the user can stop the exposure at the appropriate timing.

In the description, the image processing unit 370 superimposes a noise component on each sample image. However, an image on which a noise component is superimposed is not limited thereto, and may be an image shot by the user in the past, or may be an image of a subject that is currently being shot.

In other words, a read line selecting unit 140 may read pixel signals of a horizontal line that are part of a valid pixel unit 101 during the exposure; and the image processing unit 370 may generate an image using the pixel signals output from the valid pixel unit 101 through the selection by the read line selecting unit 140 and may superimpose, onto the generated image, a noise component corresponding to dark charge measured by the dark current component measuring unit 350.

At this time, for example, at points of time at which the quantities of dark charge are measured, pixel signals in horizontal line that are part of the valid pixel unit 101 are read along with the measurement of the quantities of dark charge so as to obtain images of subjects at the respective points of time. The gains of image signals of the images of the subject are increased to generate predicted output images of the valid pixel unit 101 at the points of time at which the quantities of dark charge are measured. Noise components corresponding to the quantities of dark charge measured by the dark current component measuring unit 350 are superimposed on the predicted output images.

Figure 17:
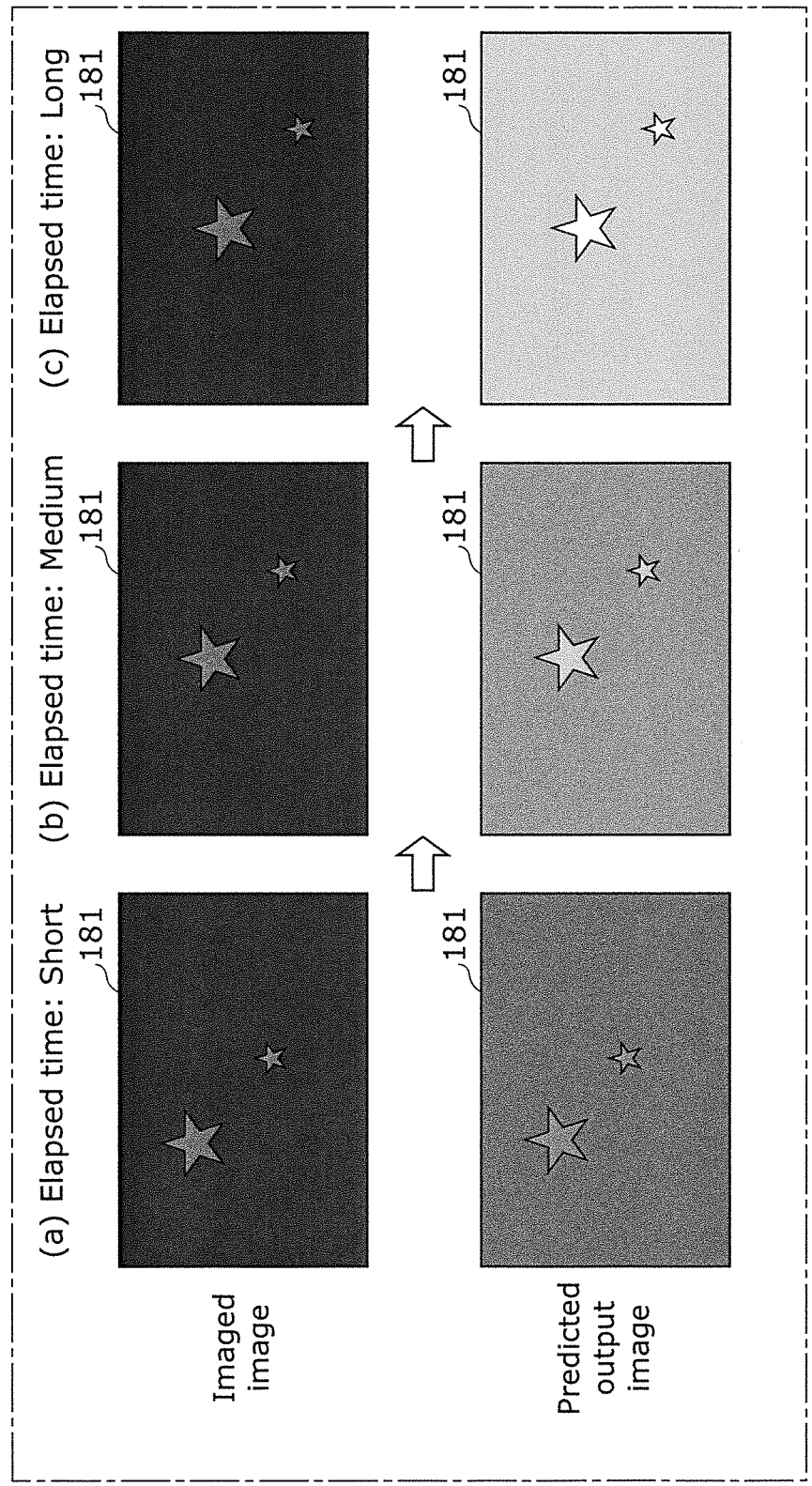
FIG. 17 illustrates other examples of images displayed on a display screen of a display unit during exposure.

FIG. 17 shows a display example of the display unit 180 in the case where a noise component is superimposed on an image of a subject that is currently being shot. FIG. 17 illustrates examples of images to be displayed on the display screen 181 of the display unit 180 during the exposure in this embodiment. In the upper part of the diagram, images shot at different points of time elapsed from the start of exposure are illustrated, and in the lower part of the diagram, predicted output images generated from the shot images in the upper part are illustrated.

As illustrated in (a) to (c) in the diagram, the images (in the upper part) shot at the respective points are read out at a certain time interval and thus do not change in brightness, but in the predicted output images (in the lower part) generated from the images above, luminance of both the subject and backgrounds increase as time elapsed from the start of exposure becomes longer. Here, the luminance in the backgrounds increases with increase in noise components due to dark charge. The luminance in the subject increases with increase in the gains of the shot images corresponding to the exposure time up to the respective points of time when the quantities of dark charge are measured.

It is to be noted that methods for obtaining images on which noise components are superimposed are not limited to the obtaining methods performed each time the quantity of dark charge is measured as described above. Alternatively, the images on which the noise components are superimposed may be generated by, for example, increasing the gains of images of an identical scene separately shot with an exposure time TI immediately before the start of exposure to the valid pixel unit 101 according to the time elapsed from the start of exposure to the respective points of time at which the quantities of dark charge were measured.

In other words, according to the methods described above, the images displayed on the display unit 180 are images obtained by superimposing noise components corresponding to the measured quantities of dark charge onto images of the subject that is currently being shot. Thus, it is possible to check deterioration in image quality of the image of the subject due to dark current. As a result, it is possible to stop the exposure at the timing more appropriate for the subject than in the case where the image obtainable by superimposing the noise component onto the sample images is displayed.

Other Embodiments

As described above, Embodiments 1 to 3 and modifications thereof have been described as examples of techniques disclosed in the present application. However, the techniques disclosed herein are not limited thereto, and are applicable to embodiments obtainable by arbitrarily modifying, replacing, adding, and omitting some part of the disclosure. In addition, it is also possible to provide a new embodiment by arbitrarily combining some of the constituent elements described in any of Embodiments 1 to 3 and modifications thereof.

Therefore, other exemplary embodiments are provided below.

Although the column-shaped gauge 181c to be displayed on the display unit 180 has been described above as an example of a graphic symbol that is displayed by the informing unit, any other graphic symbol is possible as long as the graphic symbol indicates the percentage of the difference between the quantity of dark charge measured by the dark current component measuring unit and the maximum quantity of dark charge, in the maximum quantity of dark charge. Thus, the graphic symbol may be, for example, a pie graph displayed on the display unit.

Figure 18:
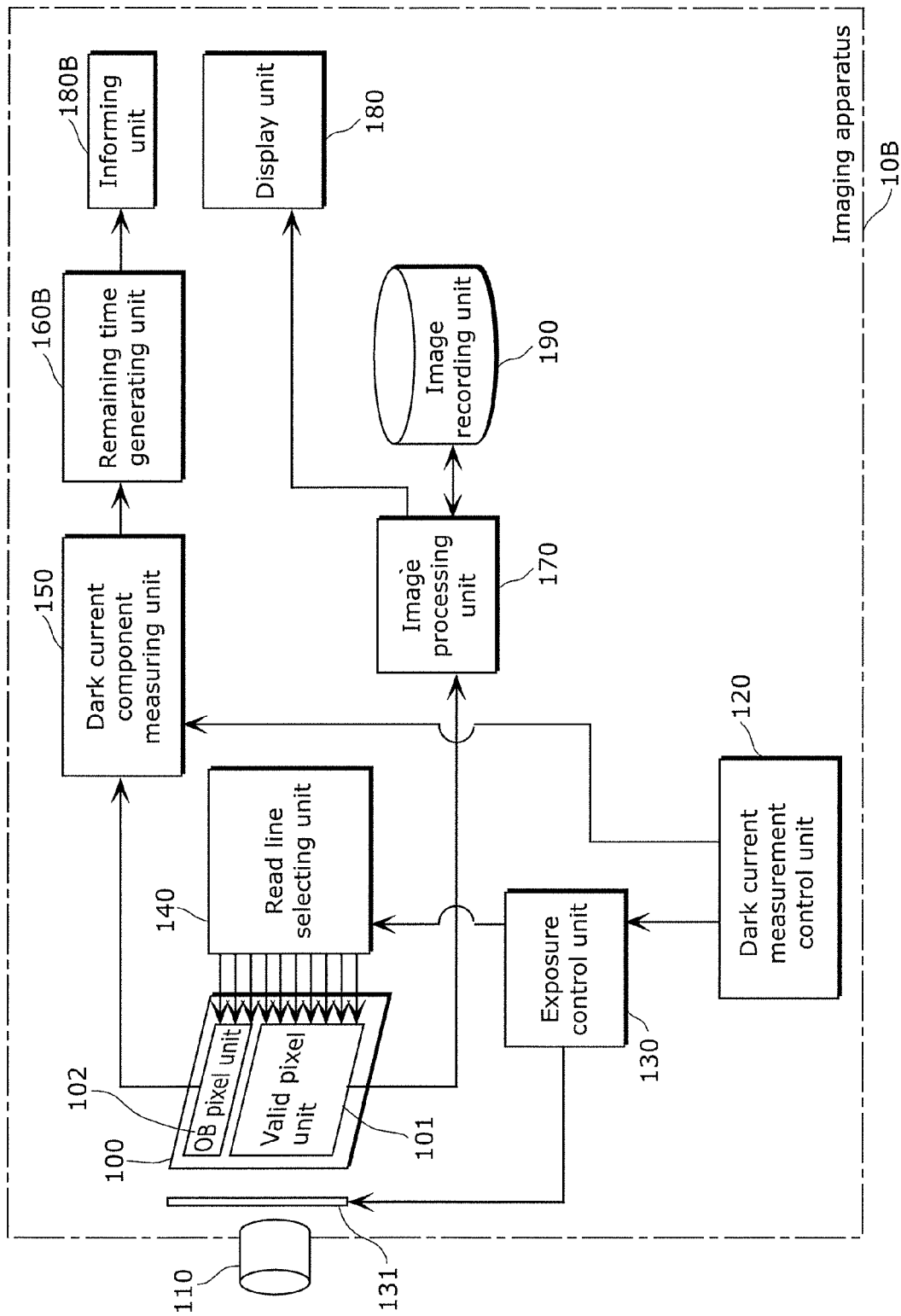
FIG. 18 is a block diagram illustrating a configuration of an imaging apparatus according to another embodiment.

In addition, although the display unit 180 has been described as an exemplary informing unit, an informing unit may be configured separately from the display unit 180. It is only necessary that the user is informed of a remaining exposure time using generated remaining time information each time remaining time information is generated by the remaining time generating unit. FIG. 18 illustrates an imaging apparatus having the configuration described above. FIG. 18 is a block diagram illustrating a configuration of an imaging apparatus 10B according to another embodiment.

As described above, an informing unit 180B is, for example, a speaker configured separately from the display unit 180 that displays an image, and the user may be informed of a remaining exposure time using remaining time information generated by the remaining time generating unit 160B.

Alternatively, an informing unit may be a display unit configured separately from a view finder. For example, an informing unit may be a plurality of light emitting diodes (LEDs) provided in columns separately from the view finder, and may inform a remaining exposure time by increasing or decreasing the number of flickering LED devices among the plurality of LED devices.

In addition, the informing unit may display, as a numerical value, the quantity of dark charge measured by the dark current component measuring unit, and the numerical value may be updated each time the quantity of dark charge is measured by the dark current component measuring unit. In addition, a remaining exposure time may be calculated using the percentage of the difference between the quantity of dark charge measured by the dark current component measuring unit and the maximum quantity of dark charge, in the maximum quantity of dark charge, and the calculated remaining exposure time may be displayed as a numerical value.

The display signal generating unit 160 described above as an exemplary remaining time generating unit is only necessary to generate remaining time information indicating a remaining exposure time using the difference between the measured quantity of dark charge and the maximum quantity of dark charge each time the quantity of dark charge is measured by the dark current component measuring unit. Thus, the remaining time generating unit may be, for example, a communication module that generates remaining time information and transmits the remaining time information to a mobile terminal of the user.

In addition, it is not always necessary that an interval at which pixel signals are read out from the OB pixel unit 102 is constant, and for example may be reduced as an exposure time elapses.

In addition, although a CMOS image sensor has been described above as an exemplary solid-state imaging device (image sensor), it is only necessary for a solid-state imaging device to include a first pixel unit in which pixels shielded from light among the plurality of rows of pixels are arranged and a second pixel unit in which pixels that allow light from a subject to enter are arranged. Thus, the solid-state imaging device may be, for example, a CCD image sensor.

In addition, for example, a part or all of the constituent elements of the respective apparatuses may be typically configured as a Large Scale Integration (LSI) that is an integrated circuit. These constituent elements may be made as separate individual chips, or a part or all thereof may be made as a single chip.

The LSI is referred to here, but there are instances where the designations IC, system LSI, super LSI, and ultra LSI are used due to a difference in the degree of integration.

Furthermore, the means for circuit integration is not limited to an LSI, and implementation with a dedicated circuit or a general-purpose processor is also available. It is also possible to use a Field Programmable Gate Array (FPGA) that is programmable after the LSI is manufactured, and a reconfigurable processor in which connections and settings of circuit cells within the LSI are reconfigurable.

Furthermore, if integrated circuit technology that replaces LSI appears through progress in semiconductor technology or other derived technology, that technology can naturally be used to carry out integration of the functional elements. Application of biotechnology is one such possibility.

In addition, the configuration of the imaging apparatus according to the present disclosure is not limited to the configuration, and it is only necessary for the imaging apparatus to include at least the solid-state imaging device 100, the exposure control unit 130, the read line selecting unit 140, and the dark current component measuring unit 150. With this configuration, it is also possible to measure variation in the quantity of dark charge due to environmental change during the exposure. Thus, it is possible to stop exposure at an appropriate timing.

In addition, for example, the exposure control unit 130 is only necessary to expose at least the valid pixel unit 101 and does not need to expose the OB pixel unit 102.

In addition, the read line selecting unit 140 does not always need to read out pixel signals sequentially on a row basis, and may be read out pixel signals on an alternating row basis. In addition, the read line selecting unit 140 may read out pixel signals simultaneously from pixels 201 in a plurality of pixel rows.

Figure 19:
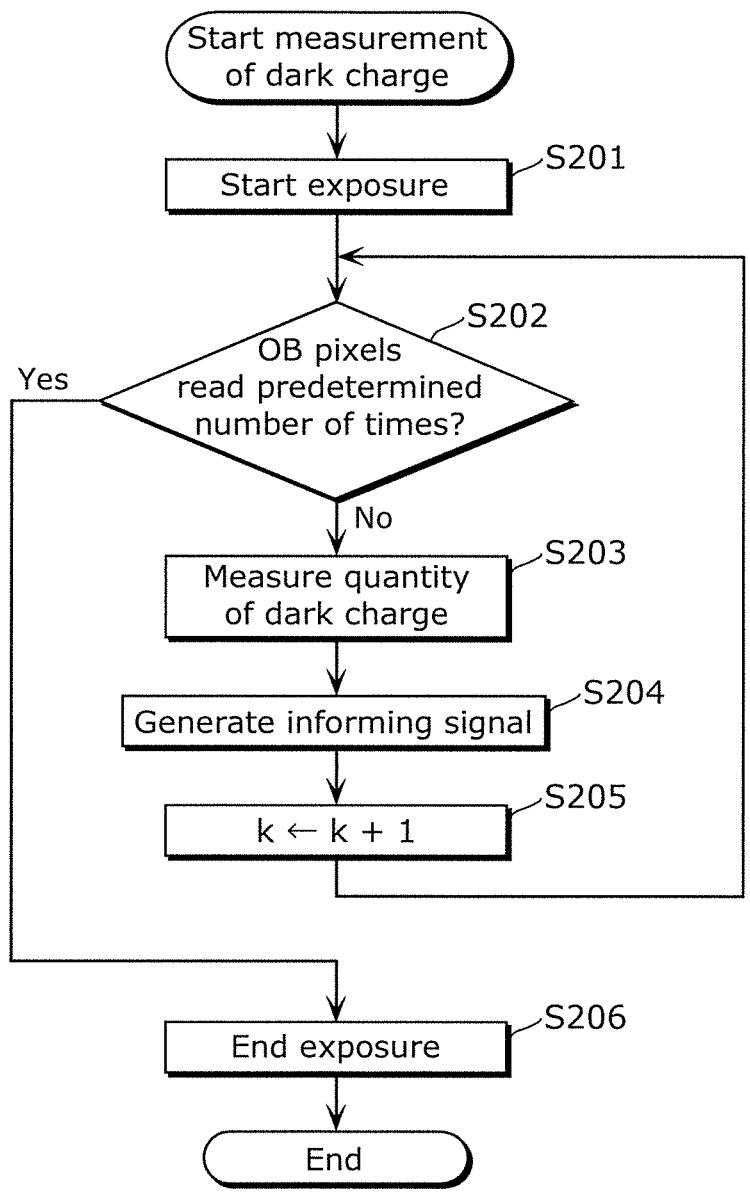
FIG. 19 is a flowchart of a dark charge measuring method in the embodiment.

In other words, the imaging apparatus executes a dark charge measuring method as illustrated in FIG. 19. FIG. 19 is a flowchart of a dark charge measuring method in one of the other embodiments. It is to be noted that processes S201 to S206 illustrated in the diagram correspond to processes S102, S105 to S107, S110, and S112 illustrated in FIG. 6, respectively in this listed order.

As illustrated in the diagram, the dark charge measuring method executed in the imaging apparatus as described above (i) includes a row selecting step (process S203) of selecting at least one pixel row in the OB pixel unit 102, and outputting a pixel signal from each of the pixels 201 in the selected pixel row, and a dark charge measuring step (process S204) of measuring the quantity of dark charge generated from dark current of the solid-state imaging device 100 using the pixel signal output in the row selecting step, and (ii) repeats the row selecting step and the dark charge measuring step during the exposure of the valid pixel unit 101, and the selection of the at least one pixel row is changed in the row selecting step per repetition.

As described above, the embodiments and modifications thereof have been described as examples of techniques disclosed herein. For this reason, the attached drawings and detailed descriptions have been provided.

Accordingly, the constituent elements described in the attached drawings and detailed descriptions may include not only the constituent elements that are essential to solve the problem but also constituent elements that are provided as examples used to illustrate the technique and thus are not essential to solve the problem. For this reason, the fact that the constituent elements that are not essential are described in the attached drawings and detailed descriptions should not directly be interpreted to indicate that the inessential constituent elements are essential.

The embodiments are provided as examples to illustrate the techniques disclosed herein, and thus it is possible to provide various kinds of modification, replacement, addition, omission, etc. within the scope of the Claims and the equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an imaging apparatus which performs long exposure shooting. More specifically, the present disclosure is applicable to digital still cameras.

The invention claimed is:

1. An imaging apparatus which images a subject, the imaging apparatus comprising:
    a solid-state imaging device in which a plurality of pixels are arranged in rows and columns, the solid-state imaging device including:
        a first pixel unit in which a plurality of rows of pixels shielded from light among the plurality of pixels are arranged; and
        a second pixel unit in which pixels allowing light from the subject to enter among the plurality of pixels are arranged;
    an exposure control unit configured to expose the second pixel unit;
    a row selecting unit configured to sequentially select one or more pixel rows of the first pixel unit, at a plurality of timings different from each other during exposure of the second pixel unit, and cause each of pixels of the one or more pixel rows selected to output a pixel signal;
    a dark charge measuring unit configured to measure a quantity of dark charge due to dark current of the solid-state imaging device using current ones of pixel signals, each time pixel signals are output from the first pixel unit through the selection by the row selecting unit; and
    a remaining time generating unit configured to generate remaining time information indicating a remaining exposure time using a difference between the quantity of dark charge measured by the dark charge measuring unit and a maximum quantity of dark charge, each time the quantity of dark charge is measured.

2. The imaging apparatus according to claim 1,
    wherein the maximum quantity of dark charge is specified by a user,
    the imaging apparatus further comprising:
    an image processing unit configured to superimpose a noise component on an image before the exposure of the second pixel unit, the noise component corresponding to a standard quantity of dark charge to be used by the user as a standard for specifying the maximum quantity of dark charge; and a display unit configured to display the image with the noise component superimposed.

3. The imaging apparatus according to claim 2, wherein the row selecting unit is further configured to select a pixel row of the second pixel unit, and cause each of pixels of the pixel row selected to output a pixel signal, and the image processing unit is further configured to generate an image using the pixel signals output from the second pixel unit through the selection by the row selecting unit, and superimpose the noise component on the image.

4. The imaging apparatus according to claim 1, wherein the exposure control unit is configured to stop exposure when the quantity of dark charge measured by the dark charge measuring unit is larger than the maximum quantity of dark charge.

5. The imaging apparatus according to claim 1, further comprising an informing unit configured to inform a user of the remaining exposure time using the remaining time information, each time the remaining time information is generated by the remaining time generating unit.

6. The imaging apparatus according to claim 5, wherein the informing unit is configured to inform the user of the remaining exposure time by displaying a graphic symbol indicating a percentage of the difference in the maximum quantity of dark charge.

7. The imaging apparatus according to claim 1, further comprising:

an image processing unit configured to superimpose, on an image, a noise component corresponding to the quantity of dark charge, each time the quantity of dark charge is measured by the dark charge measuring unit; and a display unit configured to display an image with the noise component superimposed.

8. An exposure time calculating method using an imaging apparatus which images a subject, wherein the imaging apparatus includes:

a solid-state imaging device in which a plurality of pixels are arranged in rows and columns, the solid-state imaging device including:

a first pixel unit in which a plurality of rows of pixels shielded from light among the plurality of pixels are arranged; and a second pixel unit in which pixels allowing light from the subject to enter among the plurality of pixels are arranged;

the exposure time calculating method comprising:

selecting at least one pixel row of the first pixel unit, and outputting a pixel signal from each of pixels in the at least one pixel row; and measuring a quantity of dark charge in dark current of the solid-state imaging device, using the pixel signal output in the selecting, wherein the selecting and the measuring are repeated during exposure of the second pixel unit, and the selection of the at least one pixel row is changed in the selecting per repetition, and the exposure time calculating method further comprises generating remaining time information indicating a remaining exposure time using a difference between the quantity of dark charge measured in said measuring and a maximum quantity of dark charge, each time the quantity of dark charge is measured.

9. An imaging apparatus which images a subject, the imaging apparatus comprising:

a solid-state imaging device in which a plurality of pixels are arranged in rows and columns, the solid-state imaging device including:

a first pixel unit in which a plurality of rows of pixels shielded from light among the plurality of pixels are arranged; and a second pixel unit in which pixels allowing light from the subject to enter among the plurality of pixels are arranged;

an exposure control circuit configured to expose the second pixel unit;

a row selecting circuit configured to sequentially select one or more pixel rows of the first pixel unit, at a plurality of timings different from each other during exposure of the second pixel unit, and cause each of pixels of the one or more pixel rows selected to output a pixel signal;

a dark charge measuring circuit configured to measure a quantity of dark charge due to dark current of the solid-state imaging device using current ones of pixel signals, each time pixel signals are output from the first pixel unit through the selection by the row selecting circuit; and a remaining time generating circuit configured to generate remaining time information indicating a remaining exposure time using a difference between the quantity of dark charge measured by the dark charge measuring circuit and a maximum quantity of dark charge, each time the quantity of dark charge is measured.

10. The imaging apparatus according to claim 9, wherein the maximum quantity of dark charge is specified by a user, the imaging apparatus further comprising:

an image processing circuit configured to superimpose a noise component on an image before the exposure of the second pixel unit, the noise component corresponding to a standard quantity of dark charge to be used by the user as a standard for specifying the maximum quantity of dark charge; and a display unit configured to display the image with the noise component superimposed.

11. The imaging apparatus according to claim 10, wherein the row selecting circuit is further configured to select a pixel row of the second pixel unit, and cause each of pixels of the pixel row selected to output a pixel signal, and the image processing circuit is further configured to generate an image using the pixel signals output from the second pixel unit through the selection by the row selecting circuit, and superimpose the noise component on the image.

12. The imaging apparatus according to claim 9, wherein the exposure control circuit is configured to stop exposure when the quantity of dark charge measured by the dark charge measuring circuit is larger than the maximum quantity of dark charge.

13. The imaging apparatus according to claim 9, further comprising an informing circuit configured to inform a user of the remaining exposure time using the remaining time information, each time the remaining time information is generated by the remaining time generating circuit.

14. The imaging apparatus according to claim 13,
wherein the informing circuit is configured to inform the user of the remaining exposure time by displaying a graphic symbol indicating a percentage of the difference in the maximum quantity of dark charge.

15. The imaging apparatus according to claim 9, further comprising:
an image processing circuit configured to superimpose, on an image, a noise component corresponding to the quantity of dark charge, each time the quantity of dark charge is measured by the dark charge measuring circuit; and
a display unit configured to display an image with the noise component superimposed.

* * * * *